United States Patent
Cohen et al.

(10) Patent No.: US 9,438,565 B2
(45) Date of Patent: Sep. 6, 2016

(54) CLOUD SERVICE SECURITY BROKER AND PROXY

(71) Applicant: Adallom, Inc., Palo Alto, CA (US)

(72) Inventors: Aviram Cohen, Tel Aviv (IL); Liran Moysi, Ramat Gan (IL); Ami Luttwak, Ramat Gan (IL); Roy Reznik, Tel Aviv (IL); Greg Vishnepolsky, Rehovot (IL)

(73) Assignee: Adallom Technologies, Ltd., Tel Aviv (IL)

( * ) Notice: Subject to any disclaimer, the term of this patent is extended or adjusted under 35 U.S.C. 154(b) by 0 days.

(21) Appl. No.: 14/539,980

(22) Filed: Nov. 12, 2014

(65) Prior Publication Data

US 2015/0135302 A1    May 14, 2015

Related U.S. Application Data

(60) Provisional application No. 61/902,786, filed on Nov. 11, 2013, provisional application No. 61/902,787, filed on Nov. 11, 2013, provisional application No. 61/902,789, filed on Nov. 11, 2013, provisional application No. 62/049,473, filed on Sep. 12, 2014.

(51) Int. Cl.
| | |
|---|---|
| *H04L 29/06* | (2006.01) |
| *H04L 29/08* | (2006.01) |
| *G06Q 10/10* | (2012.01) |
| *H04L 12/24* | (2006.01) |

(52) U.S. Cl.
CPC ............ *H04L 63/0281* (2013.01); *G06Q 10/10* (2013.01); *H04L 41/5032* (2013.01); *H04L 63/168* (2013.01); *H04L 67/2823* (2013.01)

(58) Field of Classification Search
CPC ....................... H04L 67/2823; H04L 63/0281
USPC ............................................................ 726/12
See application file for complete search history.

(56) References Cited

U.S. PATENT DOCUMENTS

| | | | |
|---|---|---|---|
| 6,397,246 B1 | 5/2002 | Wolfe | |
| 7,571,217 B1 * | 8/2009 | Saxena | ............. G06F 17/30902 709/213 |
| 9,137,131 B1 | 9/2015 | Sarukkai et al. | |
| 2007/0016949 A1 | 1/2007 | Dunagan et al. | |

(Continued)

FOREIGN PATENT DOCUMENTS

WO    2013091709 A1    6/2013

OTHER PUBLICATIONS

Magazinius J, Hedin D, Sabelfeld A. Architectures for inlining security monitors in web applications. InEngineering Secure Software and Systems Feb. 26, 2014 (pp. 141-160). Springer International Publishing.*

(Continued)

*Primary Examiner* — James Turchen
(74) *Attorney, Agent, or Firm* — Aneesh Mehta; Doug Barker; Micky Minhas

(57) ABSTRACT

This application relates generally to a system operating on network traffic between a network-based software as a service (SaaS) provider and a client. The system can be configured as a managed communications network proxy and take action on the network traffic based on predefined policies and rules. The system can include a suffix proxy configured for captive page processing by processing SaaS server responses so that subsequent requests are handled by the suffix proxy dependent on file type and response type.

6 Claims, 15 Drawing Sheets

(56) References Cited

U.S. PATENT DOCUMENTS

| | | | |
|---|---|---|---|
| 2009/0217354 A1 | 8/2009 | Blum et al. | |
| 2010/0146260 A1* | 6/2010 | Levow | H04L 63/0245 713/154 |
| 2011/0029613 A1* | 2/2011 | Hedditch | G06Q 30/02 709/205 |
| 2011/0289434 A1* | 11/2011 | Kieft | G06F 17/30887 715/760 |
| 2012/0023160 A1* | 1/2012 | Marmor | H04L 67/2823 709/203 |
| 2012/0030294 A1 | 2/2012 | Piernot | |
| 2013/0311863 A1* | 11/2013 | Gutkin | G06F 17/30887 715/208 |

OTHER PUBLICATIONS

Patent Cooperation Treaty International Search Report and Written Opinion for PCT/US2014/065305, ISA/US, Alexandria, VA., Date of Mailing Mar. 3, 2015.

International Search Report and Written Opinion Issued in PCT Application No. PCT/US2015/049606, Mailed Date: Feb. 25, 2016, 7 Pages.

* cited by examiner

| Category | Description | Possible values |
|---|---|---|
| Trust | Which certifications does the company has? | • COBIT 4.1<br>• HIPAA and HITECH<br>• ISO/IEC 27001:2005<br>• NIST SP800-53 R3<br>• FedRAMP Security Controls, low and moderate impact levels<br>• PCI-DSS<br>• BITS Shared Assessments SIG v6 & AUP v5<br>• GAPP<br>• Jericho Forum<br>• NERC CIP<br>• SSAE16/SOC<br>• Trustee<br>• SafeHarbor<br>• CSA Star |
| Trust | System status | Yes / No/ Unknown / Manual updates |
| Trust | Enterprise grade | • 3rd party pen test<br>• 3rd party secure code reviews<br>• Secure coding process<br>• Vulnerability patch management |
| Trust | Main service focus | Enterprise/ Consumer/ Both |
| Auditing | How granular are the logs? | None, User actions, Admin actions, Data access, etc. |
| Security controls | IP Filtering | Yes |
| Security controls | Access control | None, Basic, Granular |
| Security controls | DLP | Yes/No/Partial |
| Security controls | Risk based authentication | Yes/No/Partial |
| File sharing | Does the service support file upload? | Yes / No / Only small files / Only specific type of files |
| Encryption | SSL | Yes / No / Allow both |
| Encryption | Encryption keys for each customer | Yes/ No |
| Applications | Does the service have desktop/mobile applications? | None/ Mobile/Desktop/Both |
| OWASP | Does the service have OWASP attacks protection? And which? | Yes (WAF), No, Partial (CSRF, XSS etc.) |
| Authentication | Authentication protocols support | None, SAML, WS-Federation, Both |
| Authentication | Support for long lasting cookies (OAuth) | OAuth, Other protocol, No |
| Authentication | MFA support | Yes/No |
| Locations | Data center location | Unknown, US, EU, problematic country etc. |
| Locations | Company main site | Unknown, US, EU, problematic country etc. |

CLOUD SERVICE SECURITY BROKER AND PROXY

CROSS-REFERENCE TO RELATED APPLICATIONS

This application claims priority to U.S. Provisional Patent Application Ser. No. 61/902,786 entitled "Cloud Service Security Broker and Proxy," filed on Nov. 11, 2013, and to U.S. Provisional Patent Application Ser. No. 61/902,787, entitled "Cloud Service Risk Analysis and Threat Detection," filed on Nov. 11, 2013, and to U.S. Provisional Patent Application Ser. No. 61/902,789 entitled "Cloud Service Discovery," filed on Nov. 11, 2013, and to U.S. Provisional Patent Application Ser. No. 62/049,473, entitled "Cloud Service Suffix Proxy," filed on Sep. 12, 2014, the contents of each of which are hereby incorporated by reference in their entireties.

FIELD OF THE INVENTION

This application relates generally to securing communications networks and systems by monitoring and securing communications, in particular by use of a suffix proxy.

BACKGROUND

Enterprises are increasingly adopting cloud-based software-as-a-service offerings. These services are subject to varied network security risks. Known systems for securing these networks operate by inspecting traffic between servers operating the software-as-a-service and the endpoint operated by a user. These known network security systems typically require complex configuration of the endpoint which increases system complexity. Furthermore, in many cases, the endpoint may not be under the complete control of the enterprise, may be entirely unmanaged, or otherwise unconfigurable. In addition to the difficulties inherent in configuring and administering a user-controlled endpoint, it is difficult to ensure traffic captivation for an entire session when network addresses are generated dynamically.

BRIEF DESCRIPTION OF THE DRAWINGS

Figure 7:
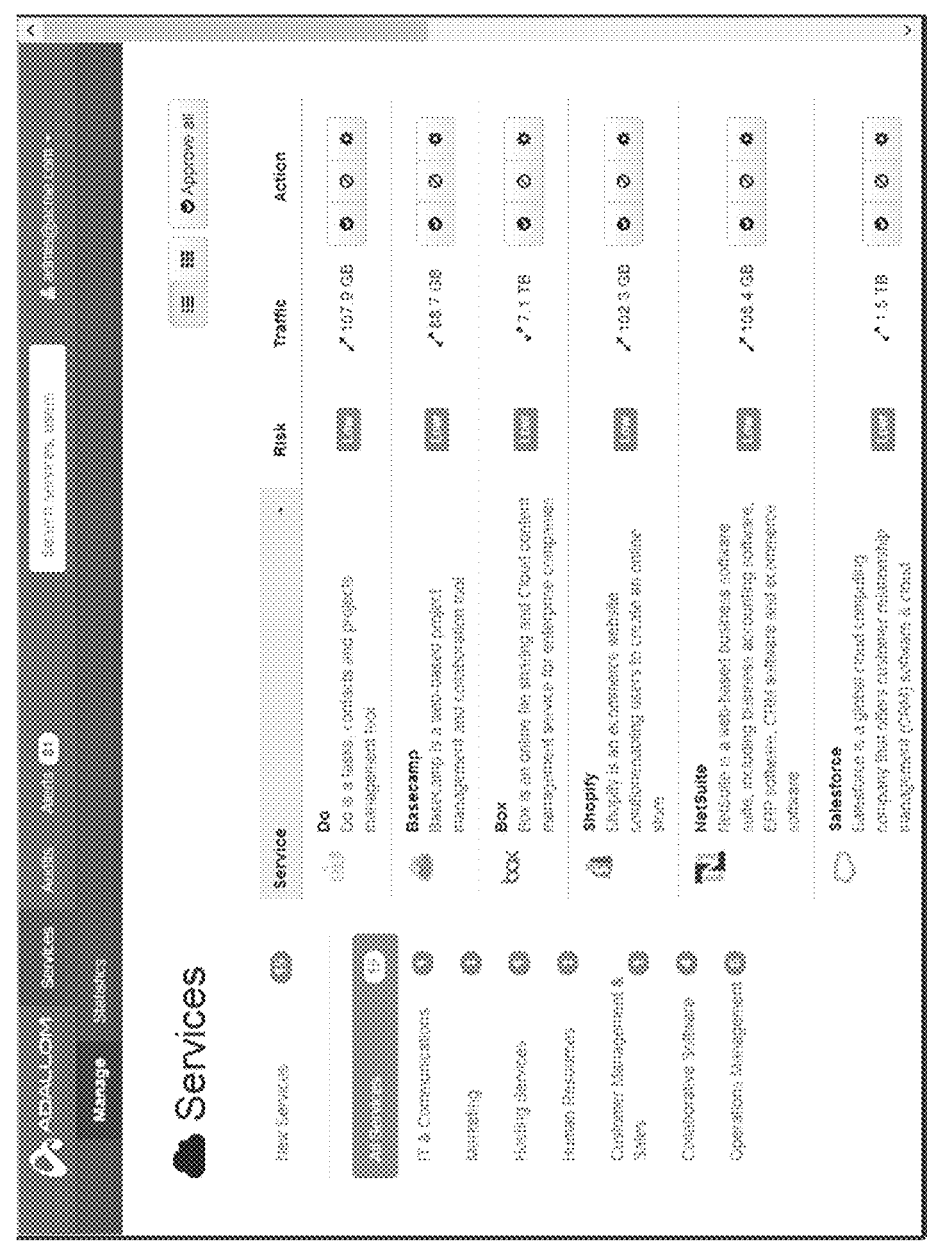

FIG. 7 illustrates an example user interface.

Figure 8:
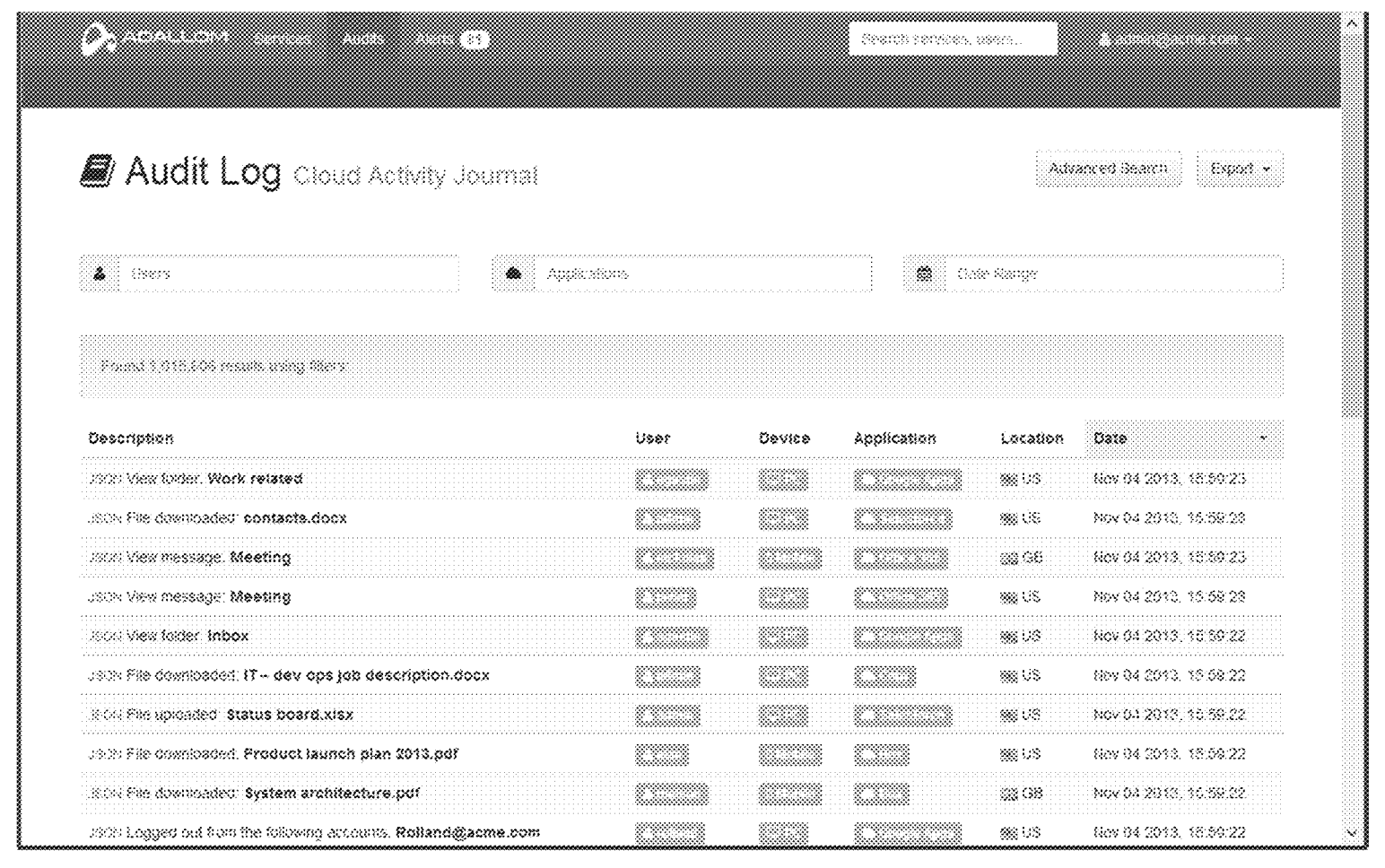

FIG. 8 illustrates an example user interface.

Figure 9:
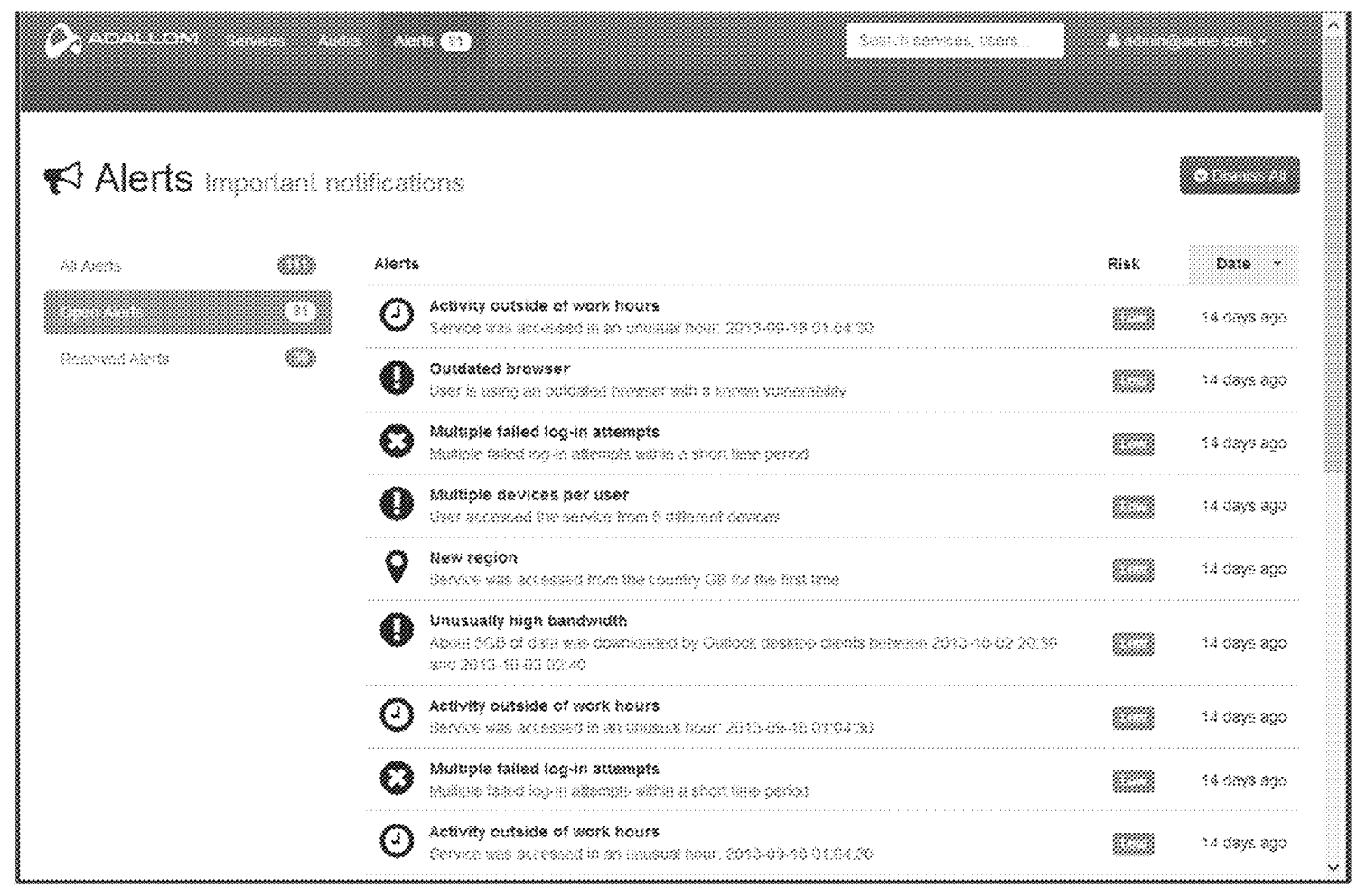

FIG. 9 illustrates an example user interface.

FIG. 12 illustrates an example parameter set.

DETAILED DESCRIPTION

An architecture for monitoring and securing communications is described herein. The systems and methods described herein can be used to transparently enable cloud traffic security and control for users anywhere. The system can be configured to secure any or all traffic and activities in a company's cloud services accounts. In some embodiments, the system can be configured so that it does not require any client side or network installation. The system can include a highly resilient virtual network composed of independent autonomous network proxies distributed in multiple locations worldwide.

The managed communications network proxy service can be used to intercept, monitor, modify, and forward network communications traffic between a user and a network-based software services provider. The managed network proxy service can be configured to operate so as to detect and mitigate network threats. As non-limiting examples, the service can be configured to operate in various modes, including application firewall mode; passive intrusion detection (IDS) mode, to notify of suspicious network traffic and behavior; or intrusion prevention system (IPS) mode, to block threats. The system can also be configured to perform application control, URL filtering, and malware protection on the network traffic.

Architecture

The system described herein can be configured to operate on network traffic between a network-based software as a service (SaaS) provider and a client. In some embodiments, the system is capable of being configured to operate on such traffic between the SaaS provider and a client computing device when that computing device is connected to the SaaS provider through a public network (such as the Internet) without any controls or restrictions having been placed on the client device or network. In some embodiments, no configuration of the client device is necessary.

Architecture Designs

The components of the system can be embodied in the form of a managed communications network proxy. While reference may be made herein to a proxy, it is understood that the proxy can be embodied in one or more network devices. Furthermore, the managed network proxy may be decentralized and the functions of the managed network proxy distributed over multiple machines in diverse geographic regions.

Figure 1:
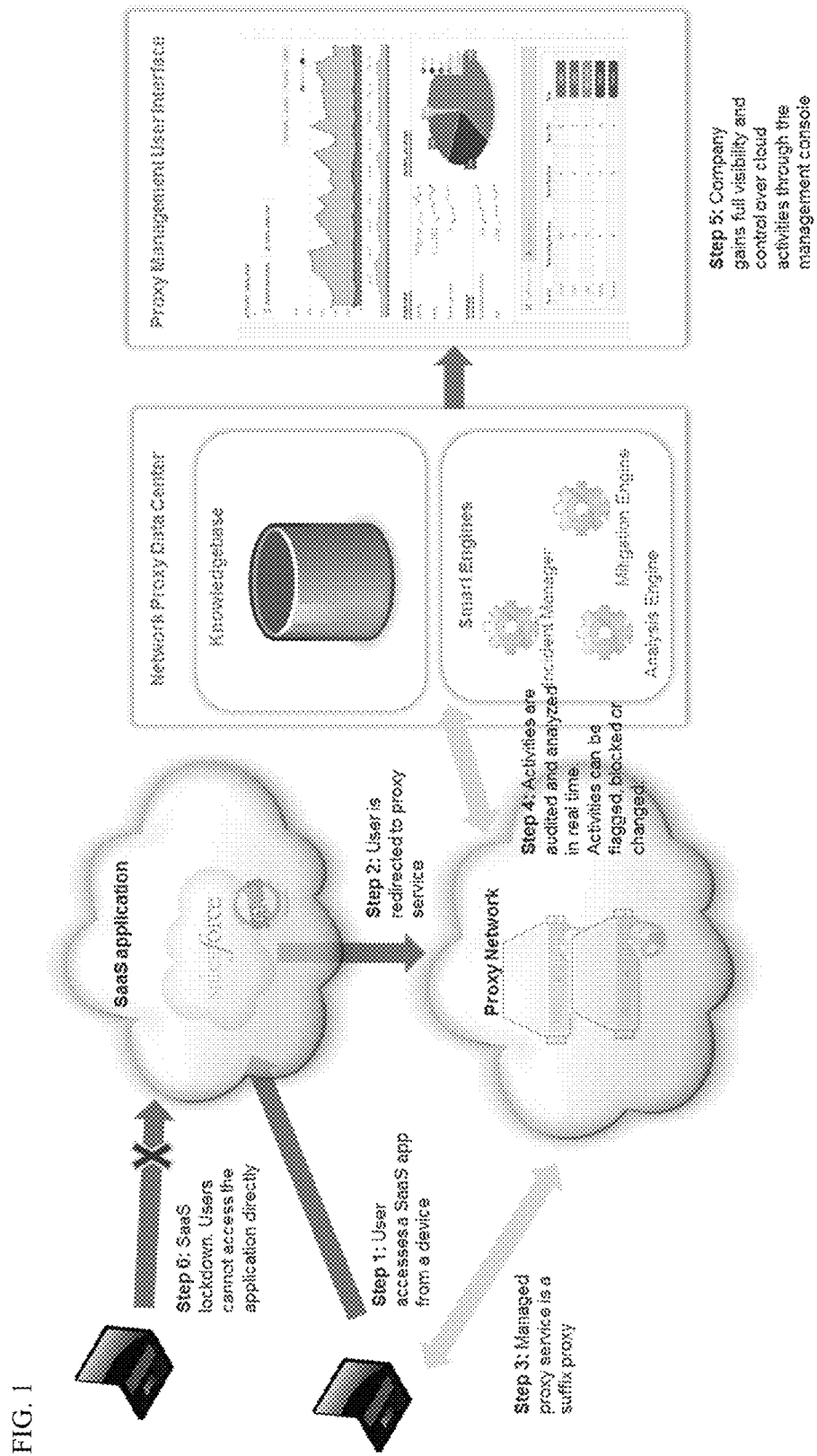
FIG. 1 illustrates an example overview of an example architecture and method operation.
Figure 2:
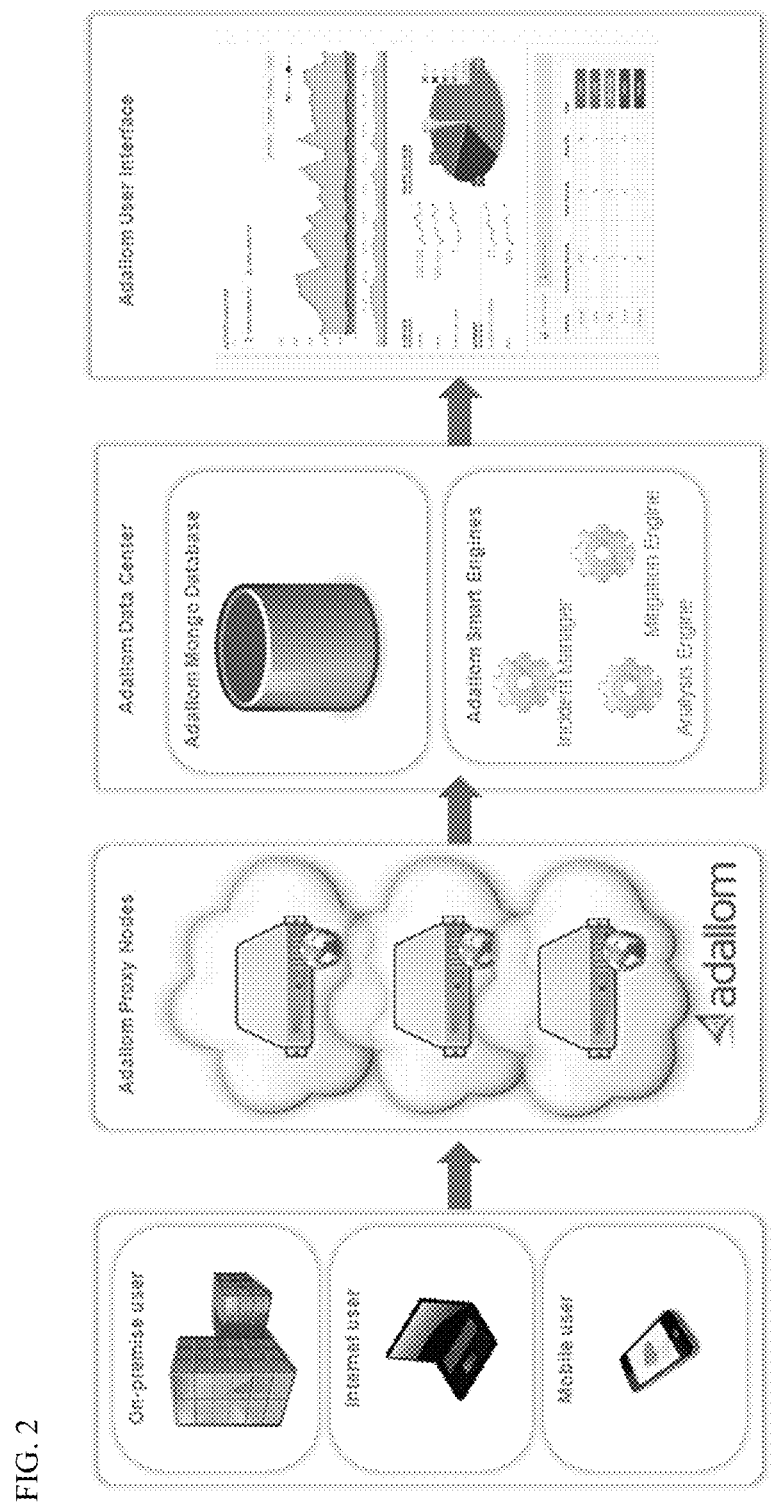
FIG. 2 illustrates an example architecture with multiple proxy nodes.

In some embodiments, the network proxy can be configured so that traffic between a client device and the SaaS provider passes through the network proxy. Because the network proxy intermediates the communications, it can be used to monitor the network traffic between these points and take action on the network traffic based on predefined policies and rules. An overview of an example architecture and method operation is illustrated in FIG. 1. The proxy network can be optimized for resilience, and fail-open controls can be used to reroute the user's traffic if the proxy network fails. As discussed in more detail below, upon deployment, the general flow of SaaS traffic is as follows:

From any location, on any device, users access an organization's cloud services. Traffic is routed through the closest managed network proxy node. Nodes can function as policy enforcement nodes and provide full auditing of cloud activities. At the proxy network data center, events are tokenized and gathered in the central data center in a separate database for each tenant. Event processing takes place and incidents are reported (e.g., "unknown device accessing sensitive data"). A user interface can be provided, by which managers can access a console and have visibility into cloud activities. Furthermore, policies can be defined and enforced by the proxy nodes. An example architecture with multiple proxy nodes is illustrated in FIG. 2.

The proxies can be configured to operate autonomously, ensuring resilience and high availability across different Internet service providers (ISPs) and geographies. In some embodiments, a star architecture can be employed wherein all nodes send information (one way) to the central data center.

The system can be configured to either fail-secure or fail-open. If an external hosting solution is used, the user can be routed to the original SaaS provider in case other means fail. This ensures a seamless experience to the user.

Public and Private Clouds

Private cloud deployment: The proxy servers can be deployed in a company's private cloud for additional security for the company data. In this arrangement, the metadata logs may still be sent outside of the organization perimeter while network traffic is contained within the organization's network.

Public cloud deployment: The proxy servers are deployed outside the company's private cloud. The cloud itself may be a public or private cloud.

Managed Network Proxy Service Infrastructure

The managed communications network proxy described herein can be configured in a variety of proxy modes, including, as non-limiting examples, a forward proxy, a suffix proxy, or a reverse proxy.

If configured as a forward proxy, the network proxy can use a Proxy Automatic Configuration (PAC) file and/or be connected to an existing network proxy in proxy chaining. If configured as a reverse proxy, deployment can be made through organizational DNS servers.

In preferred embodiments, the managed network proxy can be configured as a suffix proxy. For example, as a suffix proxy, http://www.salesforce.com would be accessed through http://www.salesforce.com.network-proxy-service-.com, where network-proxy-service.com is the domain name used for the managed network proxy service. In some embodiments, the suffix proxy can use two factor authentication, authentication to both an authentication center at the suffix proxy and to the SaaS provider.

Protocol Support

The managed network proxy can be configured to support any arbitrary application or protocol. As non-limiting examples, the following protocols may be supported: HTTP and HTTPS, RPC over HTTP, Outlook anywhere, WebDAV, FTP, and proprietary vendor protocols.

Security: SaaS Traffic Captivation

The managed network proxy can be configured to inspect the traffic and detect SaaS Internet addresses. In some embodiments, the managed network proxy can be configured to inspect the network traffic for Internet addresses (such as uniform resource locators, uniform resource identifiers, etc.) As non-limiting examples, the network proxy can decompile, deconstruct, or disassemble network traffic for inspection. The managed network proxy can be configured to modify network traffic between the client device and the SaaS provider so that no network addresses are provided to the user device that would direct the client device to access a SaaS resource directly, bypassing the managed network proxy. If a SaaS Internet address is detected, that address can be rewritten to an address at the network proxy by appending the domain name for the network proxy service to the original network address.

The suffix proxy can be configured for captive page processing by processing SaaS server responses so that subsequent requests are handled by the suffix proxy. The processing may be dependent on the file type and response type. As non-limiting examples, file types processed can include HTML or JavaScript and responses can include gzipped responses or chunked responses. The suffix proxy can be configured to emulate any content, including webpages, sent from the SaaS provider. The suffix proxy can be configured to inspect and/or decompile any content to identify any referred pages and/or URLs present in the content and to rewrite those URLs.

In some cases, the inspection will require executing code or scripts being transferred between the client and the SaaS provider. For example, JavaScript can be emulated at the network proxy to detect the generation of network addresses that would directly access the SaaS provider. If direct access addresses are identified in the content, the content can be modified to rewrite the addresses to refer to the network proxy.

Security: SaaS Service Lockdown

The system can be configured to limit access to the SaaS service only through the managed network proxy. The system can include multiple techniques for this lockdown, and the technique chosen may depend on the deployment method, described in more detail below. Network traffic can be locked down at the time a session is created, or at any time thereafter. Session initiation is described in more detail below.

Lockdown Method 1: Credentials Replacement

In some environments, the SaaS provider may use Security Assertion Markup Language (SAML). In those environments, SAML token replacement can be used to lockdown the network connection. For example, the SAML token may be valid for 5 minutes. When a SAML proxy is configured, users can access the service only through the managed network SAML proxy.

Browser cookie replacement can be used to lockdown the connection. When a user authenticates to the SaaS provider, the SaaS provider sends a cookie to the user. The cookie sent may be an authentication cookie used by the SaaS provider to indicate whether the user is logged in or not, and which account the user is logged in with. Because the managed network proxy is between the user and the SaaS provider, it can intercept and encrypt the user browser cookie sent by the SaaS provider. The managed network proxy can then send the encrypted cookie to the user for storage on the user's device. Thus, the user only keeps an encrypted copy of the cookie which cannot be used directly by the client on the original SaaS site. When used through the managed proxy network, the cookie is sent from the client device to the proxy network, decrypted in the proxy network, and sent to the originating site. In some cases, the cookie generated by the SaaS provider may be encrypted or contain encrypted content. In these cases, the managed network proxy can add an additional layer of encryption to the cookie before sending it to the client.

Similar to the way browser cookies can be replaced, OAuth tokens (or any other persistent API token) can also be replaced inline. The managed network proxy can track requests for tokens by the client (for example, OAuth tokens used by mobile applications) and replace them with an encrypted version. This enables enforcement of service lockdown across additional authentication scenarios.

The managed network proxy can also proxy a user password. This technique can be applied to any SaaS service. In some embodiments, a password proxy can be used when SAML is not supported. To implement this, the SaaS service password can be split into two or more parts. The user knows less than all of the parts of the password. The managed network proxy service stores the remainder of the password. In this arrangement, the full password can be composed only when the user accesses the SaaS service through the managed network proxy service. The technique does not require the managed network proxy service to store user passwords. For example, adding a hash suffix to all passwords requires storing only a single hash key.

Any efforts by a user to change a password in the SaaS application can be monitored through the managed network proxy service, and the user can be permitted to set part of the password. In some embodiments, the user is only enabled to set half of the password. When a password proxy is configured, any request for a password change (e.g., "forgot my password" links) can be monitored by the network proxy and the network proxy can be configured to hash to the new password.

Lockdown Method 2: Access Restriction

In some cases, the SaaS application can be configured to enable an Internet protocol (IP) address restriction feature and thereby restrict access to only Internet protocol (IP) addresses associated with the network proxy service.

Additional Security Functions

The managed network proxy service can be configured to support additional security functions. As a non-limiting example, the network proxy can be used to perform an audit of user activity whereby any user action can be parsed and/or audited from the traffic stream. The network proxy can be used in policy enforcement. For example, the proxy service can be used for access control to prohibit a specific operation; for data loss prevention (DLP), by implementing DLP policies based on the context of the user, device, location, action, content, and/or velocity; for dynamic masking; and for watermarking Network threats can also be detected and/or blocked using threat characterization logic.

The managed network proxy service can be configured to provide enhanced file protection services. In some embodiments, the network proxy service can support integration with network-based file storage services. Non-limiting examples of these types of services include Google™ Drive, Dropbox™, etc. The network proxy can be configured to prevent a user from retrieving files from the SaaS provider and storing them locally on the user's device. This may be referred to as an "always in the cloud" policy. In some embodiments, this can be configured to change and redirect information flows dynamically during a user session so that files are not transferred between SaaS application and the user's device or between SaaS applications. In some cases, in lieu of downloading the file, a version of the file may be displayed to the user.

VPN Over Web

The proxy service can be configured to enable secure access to corporate intranets. Once the user is authenticated at the network proxy service, the user can access an intranet site over the web (using, for example HTTP(S)). This method does not require a dedicated VPN client on the device. Once a connection is initiated, the network proxy service opens a VPN connection and functions as a reverse proxy for HTTP(S) intranet sites. Other features such as user auditing, alerting and file protection can be enforced on VPN connections.

Deployment Methods

The system can be deployed by any of various means, alone or in combination. In some configurations, the system can be deployed without any configuration of the client. In other configurations, the client can be configured instead of or in addition to configuration at the SaaS.

Transparent Deployment Methods

The system can include techniques to transparently forward traffic between the user and the SaaS provider through the managed network proxy. In these embodiments, access to the SaaS application can be restricted to only users of the proxy. These techniques enable the operation of a security control without any installation on the user device or user's local network. This technique can be used on a global basis for all applications hosted by the SaaS provider.

A. Transparent Authentication Proxy (Authentication Layer)

By leveraging built-in support for Security Assertion Markup Language (SAML) or similar protocols in cloud services, a user can be automatically redirected to the managed network proxy servers without any configuration on the client side. For example, SAML is an XML standard that allows secure web domains to exchange user authentication and authorization data. Using SAML, an online service provider can contact a separate online identity provider to authenticate users who are trying to access secure content.

As a non-limiting example, this technique can be used with SaaS services that support SAML and organizations that already have an external SAML provider. In these cases, the managed communications network proxy is configured as the SAML provider, and the proxy service then uses the original SAML provider to perform the authentication. Upon successful authentication, the user is redirected to the SaaS provider through the suffix proxy provided by the network proxy service. (The suffix proxy service is described in more detail below.)

The access control features of SaaS applications can be used to restrict access to users of the suffix proxy. The SAML proxy can also be used to install a browser add-on instead of redirecting to a suffix proxy. In this case, the add-on will direct the traffic to the network proxy service transparently and a reverse proxy will be used instead of a suffix proxy. In addition to SAML, the managed communications network proxy could be configured to interoperate with other protocols that have similar functionality. For example, WS-Federation™ could be used in connection with Office 365™ services.

Figure 3:
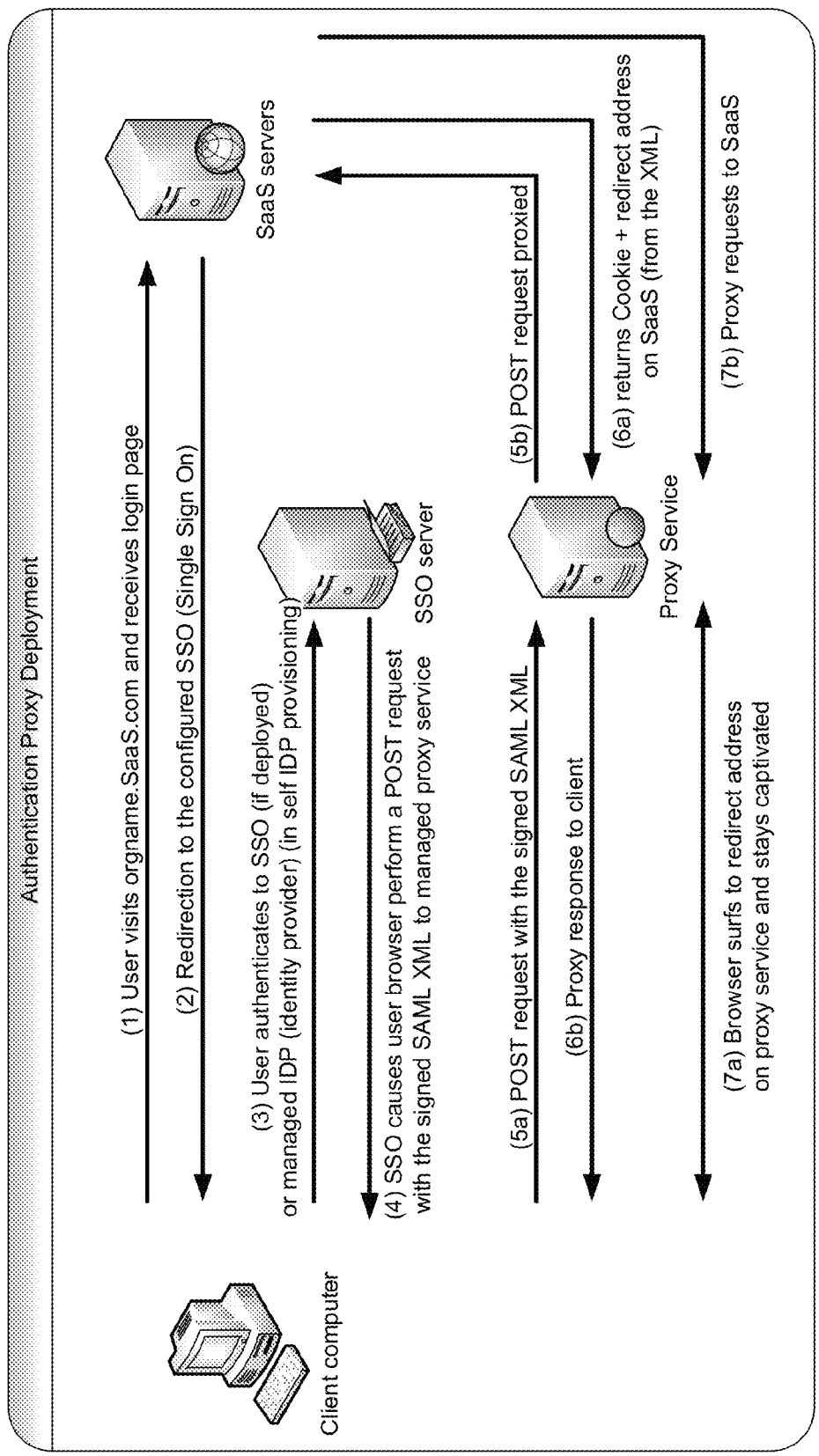
FIG. 3 illustrates an example authentication method using SAML.

An example authentication method using SAML is illustrated and described in FIG. 3.

B. Transparent Self IDP Provisioning (Authentication Layer)

Self IDP provisioning can be used instead of a Single Sign On solution. This is a variant of the SAML proxy method where the user is redirected to the managed SAML proxy service but the authentication process is performed by the managed communications network proxy service. A login proxy can be used. Upon user login request, the managed network SAML proxy queries the original SaaS service to verify the user credentials. Using password synchronization, the network proxy service can function as an ad-hoc SAML provider by installing a password synchronization tool which synchronizes user passwords from an Active Directory (or any other LDAP directory) to the managed network SAML proxy.

C. Transparent Gateway Proxy (Traffic Layer)

This technique can be applied to any SaaS service and may be particularly applicable in cases where SAML is not supported by the SaaS service. The user can be instructed to use a different URL when accessing the SaaS service. The URL redirects the user through the managed network proxy service. This configuration can use access control features of SaaS applications to restrict access to users of the suffix proxy. The IP restriction feature can be enabled to limit access only to IP addresses located in the managed communications network proxy service.

Non-Transparent Deployment Methods

Mobile and desktop applications can be configured individually by using installation or configuration changes to the user's device in order to redirect the traffic through the managed communications network proxy service.

A. SAML proxy: Using the SAML proxy described above, the user can be redirected to a page requesting that the user install and/or configure the device to communicate with the managed communications network proxy service.

B. Desktop applications (traffic layer): Most desktop applications support the system proxy configuration. The PAC file can be auto-configured for managed devices and user-configured for unmanaged devices. PAC is supported by major operating systems (OSes), browsers and applications and can be deployed in a Windows domain environment using a Group Policy Object (GPO). The PAC file can be configured to allow only SaaS traffic through the managed proxy network platform and the rest of the user's Internet traffic can be routed directly without change.

C. Mobile applications (traffic layer): Similar to the PAC method for managed devices, mobile devices may require an installation of a VPN or APN on the device and a managed proxy network certificate.

Application specific solutions: Some applications have specific configuration options that enable seamless redirection. For example, using the Outlook auto-discovery feature, Outlook clients are automatically redirected to the managed proxy network Outlook proxy.

Deployment Methods for Managed Networks and Devices

In some embodiments, the managed network proxy can be embodied in an appliance on the user's premises. In other embodiments, the managed network proxy functionality can be achieved through a web browser add-on. The browser add-on can be configured to operate like the PAC file, in that once a SaaS application is detected in the browser, traffic is redirected to the managed proxy network.

Some embodiments can be configured to use proxy chaining whereby an existing organizational proxy is configured to forward SaaS-bound requests through the managed communications network proxy service infrastructure. These embodiments can optionally include an organizational identifier (username and/or IP) with the forwarded request.

In some embodiments, a PAC file can be used. The PAC can be deployed throughout the organization. The PAC can be used to redirect SaaS applications to the managed communications network proxy service. This can be based on a database of SaaS providers. An efficient PAC with a compiled list of domains to a tree based on the domain names can be used.

In any of these configurations described above, the platform can be dynamically deployed on specific users or groups of users, thereby allowing for gradual deployment. This can be done based on the SAML proxy, for example, by rerouting only some of the users.

System Availability

Figure 4:
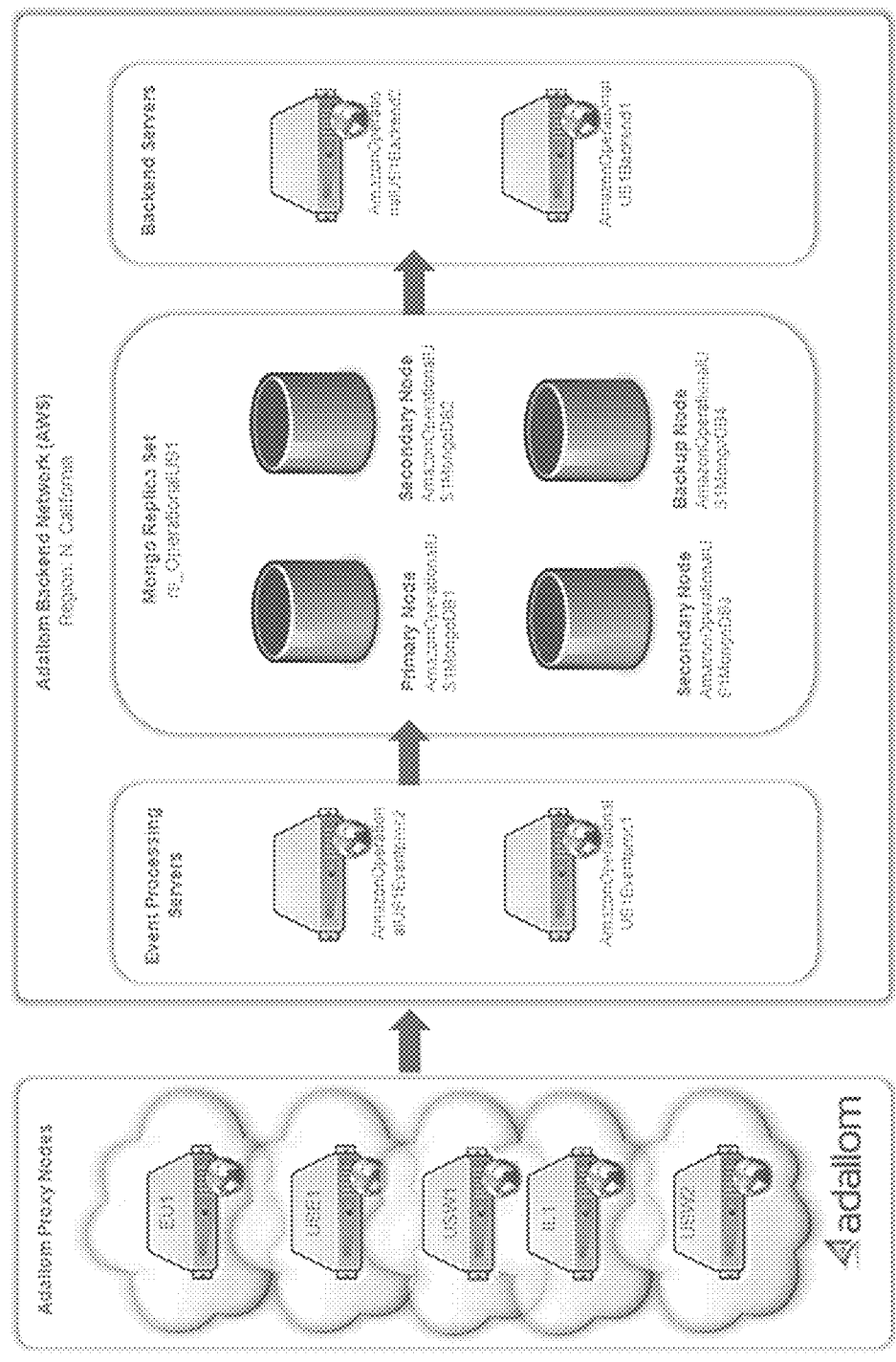
FIG. 4 illustrates an example of multiple distinct networks, including proxy nodes globally distributed for reduced latency.

As illustrated in FIG. 4, the platform can include multiple distinct networks, including proxy nodes globally distributed for reduced latency (for example, in five centers, as illustrated). Users can be routed to the closest node or another optimal node. The system can include automatic DNS failover between nodes. Any of the nodes can function as a policy enforcement point and create auditing logs. As a non-limiting example, the backend network can be an AWS Virtual Private Cloud (VPC) containing the central database and backend servers.

DNS High Availability

Figure 5:
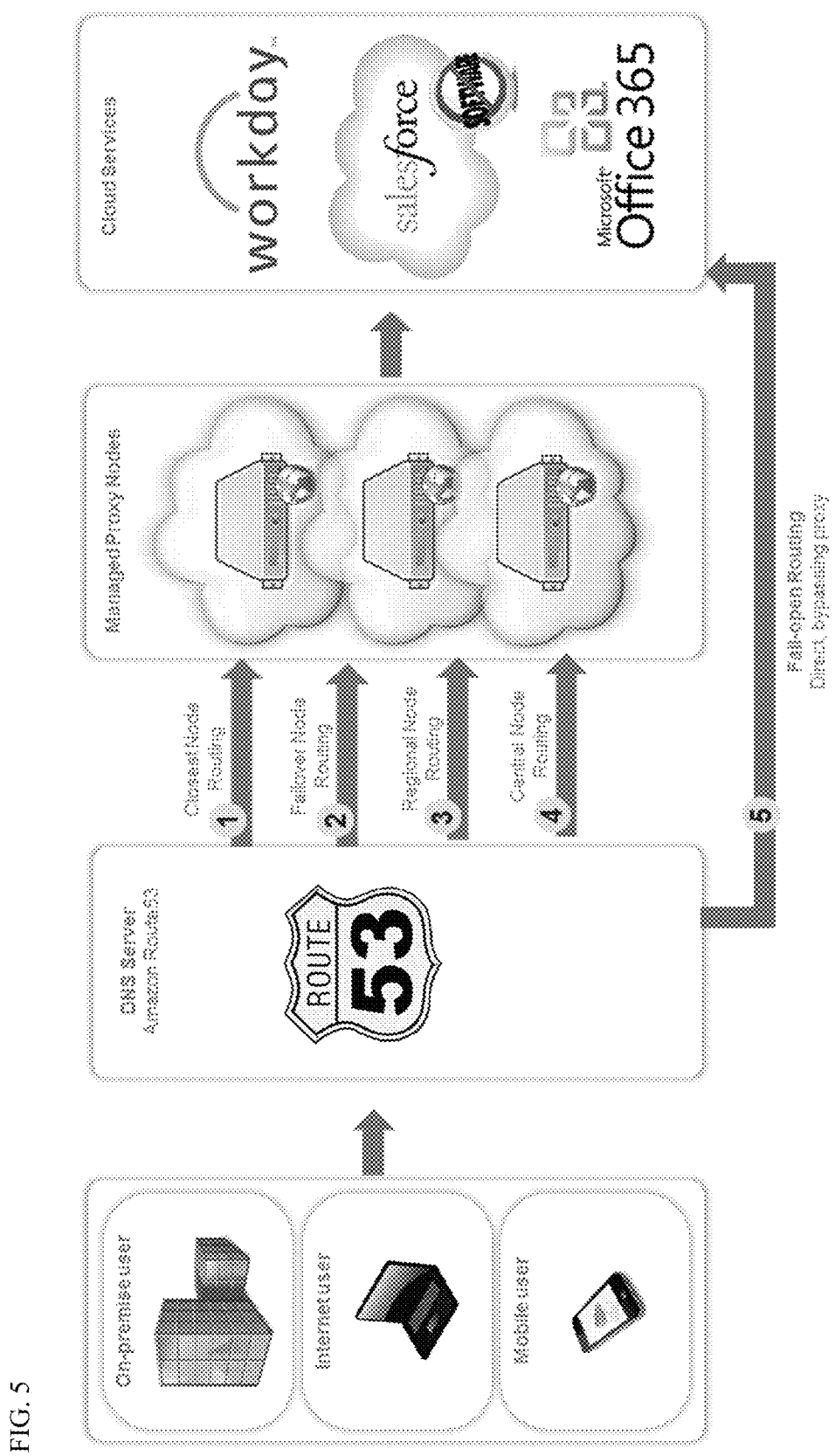
FIG. 5 illustrates an example network proxy architecture showing fail-open routing.

An example network proxy architecture showing fail-open routing is illustrated in FIG. 5. The proxy node network can use the DNS server to implement high availability. The DNS records can be set to a very short time to live (TTL) (for example, 30 seconds), forcing the clients to query the DNS server for updates regularly (query times may vary depending on browser cache settings). The server directs the client to the closest node available (Geo-DNS) and, in case of node failure, can detect the problem and redirect clients seamlessly to other available nodes.

The availability of the DNS service itself can affect the described behavior. For example, Route53 by Amazon is considered a mature and highly available system guaranteeing high availability. In the event the DNS server itself is down, the system can be configured to fail open.

Autonomous Nodes

The proxy nodes can be built in clusters in various global regions. Some or all of the nodes can be simultaneously online and serving customers. In case of failure, nodes are stateless, allowing the system to move users between nodes without any service interruption.

Figure 6:
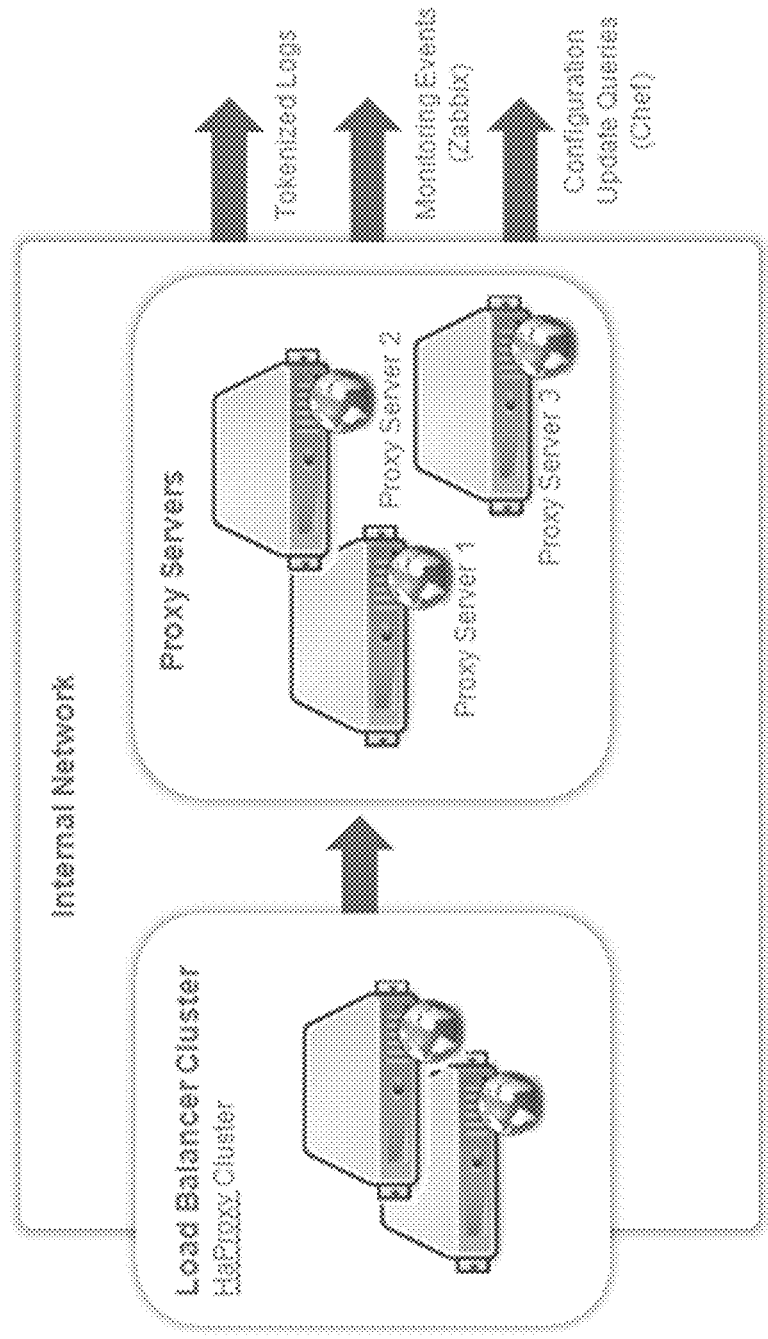
FIG. 6 illustrates an example proxy node composed of a cluster of load balancers and multiple proxy nodes.
Figure 10:
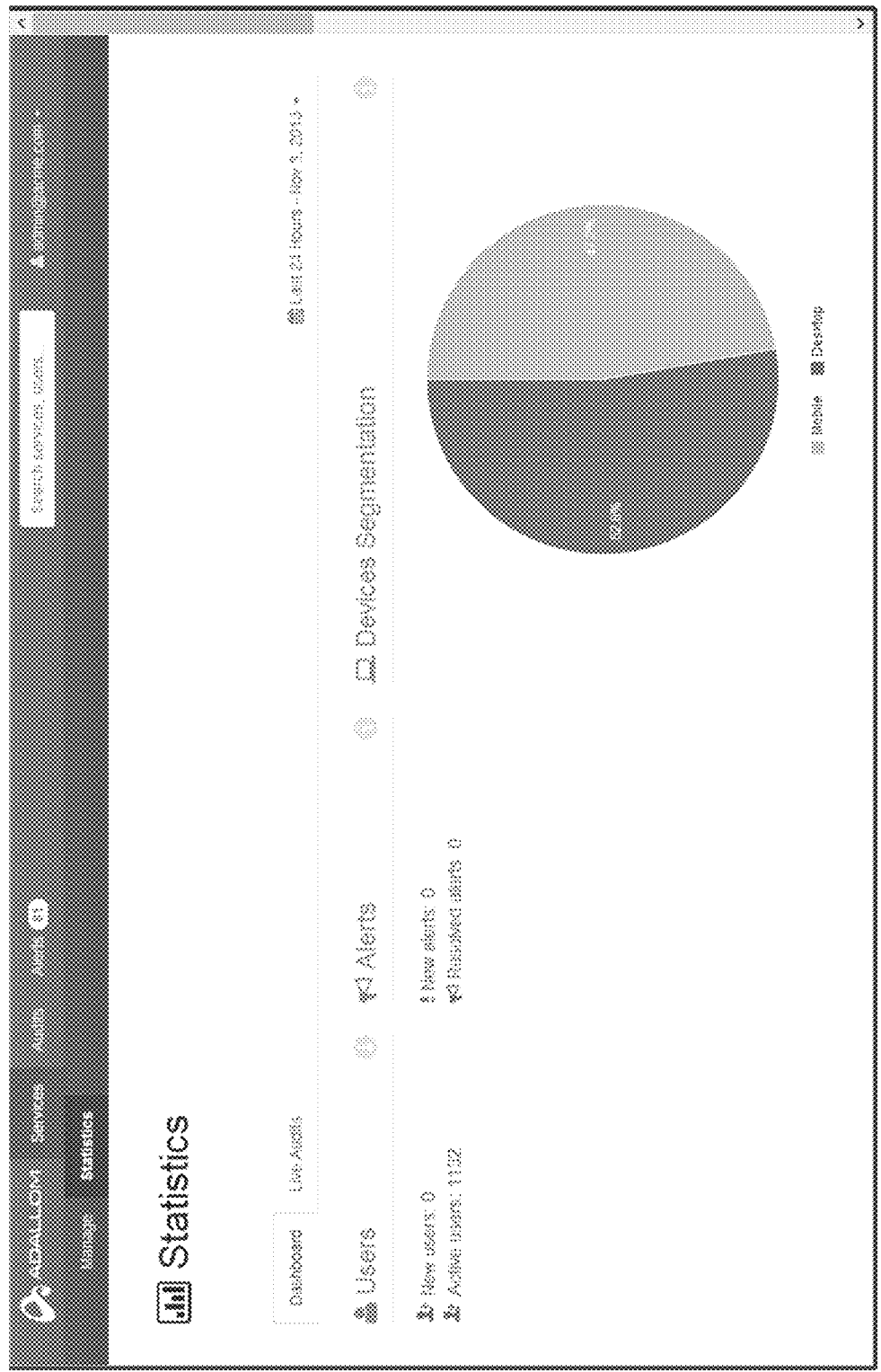
FIG. 10 illustrates an example user interface.

Nodes can be autonomous and resilient. As illustrated in FIG. 6, a proxy node can be composed of a cluster of load balancers and multiple (for example, 2 or 3) proxy nodes. Some of the central nodes can rely on external load balancers provided by the cloud provider itself (e.g., ELB and RackSpace) allowing for even greater resilience. Each node can function autonomously without any dependencies on other parts of the platform. The communication with the backend network can be performed using broker messages and be completely asynchronous. In case of backend failure, the messages are stored internally in a capped sized queue, and operation of the node itself is not affected. In the example embodiment illustrated in FIG. 6, each node can be composed of a cluster of load balancers and several proxy servers. There can be multiple central nodes (such as US West, US East, Europe and Middle East) that use external load balancers (such as AWS and Rackspace load balancers) with built in distributed denial of service (DDoS) protection (the load balancers route traffic and might not perform SSL termination). In case of a DDoS attack, traffic can be automatically routed to the nearest central node.

Failover Scenarios

The system can be configured to handle many different failover scenarios. Some possible scenarios and resolutions are described below.

Single Machine Failover: In this case, the DNS routes the request to the closest node. Each node operates independently and handles failovers internally.

Failure of an internal process: Full redundancy starts from the machine level, where each critical process is guarded by a watchdog and restarted immediately. Critical processes have several instances constantly running. All non-critical operations are performed asynchronously.

Failure of a proxy server: Will drive the traffic to the other proxies in the node.

Failure of a load balancer server: Will cause all traffic to go through the second load balancer in the cluster.

Single Proxy Node Failover: Single node failures might be caused by data center outage or ISP connectivity problems. In case the node fails to respond, the DNS Failover will route the traffic to next available node without user disruption.

Regional Failover: Even in case of a regional problem affecting multiple nodes, the system will continue normal operation. The DNS failover will route the traffic to the remaining functioning nodes in other regions. Users from the impacted region might experience higher latency than usual, but to a lesser degree.

Central Node Failover: Although the DNS server performs load balancing between available nodes, unusual spikes might cause a chain reaction affecting the auxiliary nodes. For this reason, in case of multiple failures, traffic is routed to the central nodes which are specifically designed to handle unusual traffic spikes.

Additional Features

The managed network proxy service can be configured to additionally provide metrics relevant to business analytics, adoption statistics, feature usage, license utilization, user engagement, and service level agreement (SLA) monitoring, as non-limiting examples.

The service can also include a command and control center for the SaaS service, an alerts center, and a usage statistics center. The service can perform role enforcement to enforce making data accessible to each user according to the user's role and realm. The service can perform dynamic SSL pooling to maintain several backend connections to SaaS providers according to predetermined daily usage patterns.

Example management consoles for the managed network proxy service and other features are illustrated in FIGS. 7-10.

Threat Detection Logic

Using the systems and methods described above, the network traffic between the networked SaaS provider and the client device can be intercepted at the proxy node. The proxy node can be further configured to analyze the traffic for various threat indicators using threat detection logic.

Figure 11:
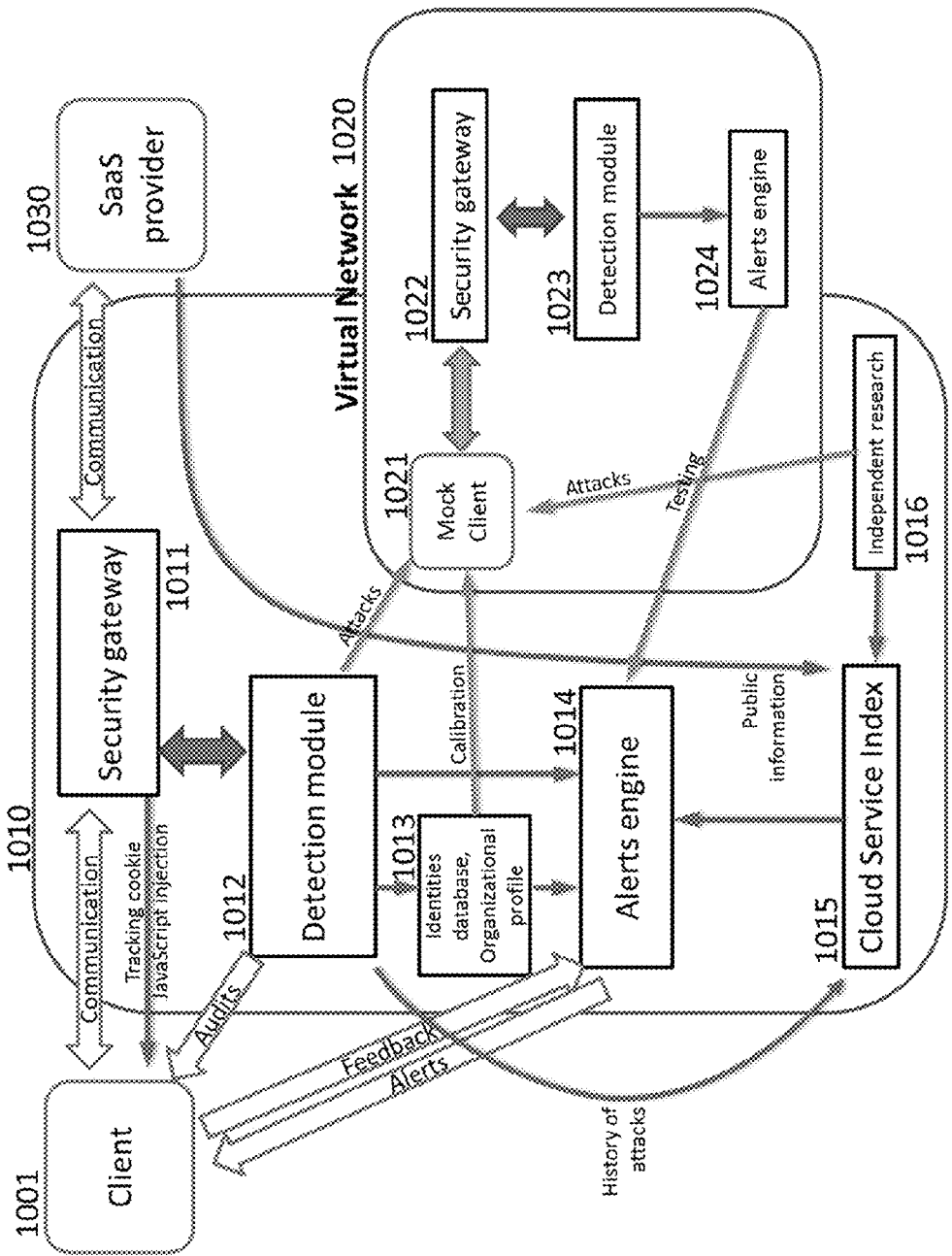
FIG. 11 illustrates an example method for threat detection.

An overview of a method for threat detection is illustrated in FIG. 11. The security gateway (1011) can be implemented as an algorithmic routine in one or more of the proxy nodes (1010) through which a user's network traffic is carried. Alternatively, the security gateway may be embodied in a separate device through which the traffic is carried. The user traffic may be between any source and destination connected to the proxy node. Non-limiting examples of users may be an on-premises user, an internet user, a partner user, or a mobile user.

The security gateway (1011) can be configured to extract various parameters from the user traffic. The following non-limiting examples are provided. The security gateway can be configured to extract information descriptive of the user device. As non-limiting examples, the device parameters can include the type of device such as an iPad or Surface tablet, operating system of the device such as Windows RT or iOS, and/or web browser being used, such as Chrome or Explorer. The security gateway can be configured to extract information descriptive of the location of the user's device. The location information can be descriptive of the physical/geographic location and/or logical location on a network. The security gateway can be configured to extract information relating to an action being taken by a user (e.g., request for data) and/or a response by the SaaS platform (e.g., sending requested data). The security gateway can also be configured to extract information relating to the identity of the user's device (in addition to its type), the time of the user's activity, and the bandwidth consumed by the user's actions.

The security gateway can also be configured to detect and identify any communications device being used by a user to connect to the SaaS provider. The device identification can be logged in connection with the user's access history so that individual SaaS sessions can be associated with the specific device used for that session. The identifying information stored can include the International Mobile Equipment Identity (IMEI), phone number, media access control (MAC) address, internet (IP) protocol address, or other uniquely or substantially uniquely identifying information. This device identification information can be tracked across multiple user sessions and/or stored in connection with the associated user profile. Subsequent queries can then be executed to determine what device was used by a given user to access a given SaaS service in a single session or across multiple sessions.

The traffic parameters can be input to a detection module (1012). The detection module can also receive input based on user profile information from a user profile data store. The user profile information can include information about the user whose traffic is being analyzed. As a non-limiting example, the user information can be sourced from the detection module. The detection module can also receive input from a knowledgebase including other information such as information about specific security threats. In a preferred embodiment, the knowledgebase can include the cloud service index (1015) as a component. In some embodiments, the detection module (1012) can be included as a component of the security gateway (1011). In alternative embodiments, the detection module (1012) can be a separate component in communication with the security gateway (1011).

The threat detection module (1012) can include a profiling engine, distance-based anomaly engine, and a statistical-based anomaly engine. The statistical anomaly engine can be configured to make threat assessments based on a combination of short- and/or long-term statistical information. Each engine can receive any or all of the traffic parameters described above. Each of the engines can also receive input derived from the other engines.

Anomaly Engine

The anomaly engine can be configured to detect a specific anomalous operation, a series of anomalous operations, and/or a pattern of anomalous operations. For example, the engine can be configured to determine whether a specific operation being performed by a user or the SaaS provider is suspicious based on it being performed more frequently than historical data acquired over a learning time predicts it would be performed (e.g., higher rate of operations, etc.) or the connection has a new source or destination location. The anomaly engine can also be configured to determine whether a sequence of operations by the user is suspicious. In some cases, an individual operation may not be suspicious. However, when that operation is performed in sequence with another operation, the set of operations may be suspicious. For example, a user may authenticate with the SaaS provider and then begin transferring files out of the system. As an example, the anomaly engine can be configured to identify this sequence as suspicious. Thus, anomaly detection of suspicious traffic may be based on a sequence of activities which may be composed of a number of operations. The anomaly engine can also be configured to determine whether a pattern of non-sequential operations is suspicious. In suspicious pattern detection, the anomaly engine can be configured to examine actions taken out of sequence and over arbitrary periods of time. The suspiciousness of individual operations, sequences of operations, and patterns of operations can be determined based on any of the parameters described herein.

Anomalies can be detected based on comparing one or more parameters to previously stored profile information. As non-limiting examples, the profile information can include: location, time of activity (hour of day, day of week, etc.), device usage, user-agent (type and version), frequency of actions/requests, type of actions performed, order of actions performed, type of information accessed, traffic bandwidth, session characteristics (length, idle time, etc.), and/or HTTP requests characteristics (which resources are accessed, methods, headers, capitalization, etc.).

Cloud Service Index

The threat detection logic can include a cloud service index (1015) comprising a set of parameters that combine SaaS application risk factors for any given SaaS provider. An example parameter set is illustrated in FIG. 12. The risk level assessment can be based on information from some or all of the sources, including but not limited to:

1. Information provided by the SaaS provider regarding its security policy sourced from, as non-limiting examples, whitepapers, certifications, etc.;

2. Independent research concerning the SaaS provider, the client, and other environmental factors; and/or 3. A history of vulnerabilities and/or attacks on clients' SaaS applications, identified by the detection module, based on analysis of the traffic intercepted by the security gateway.

The risk can be measured with respect to one or more axes, including but not limited to:

1. Data risk: Risks imposed on the data that the SaaS holds, such as multi-tenancy and using non-encrypted data;

2. User/Device risk: Risks imposed by connected users and devices including, for example, authentication quality, anonymous usage capability, etc.;

3. Service risk: Risks imposed on the service provider's network, such as the quality of the security practices the provider claims to perform, web application security level, vulnerability management, etc.; and 4. Business risk: The control the provider allows to its clients and the ability of these control measures to protect the usage of the service, including, e.g., auditing capabilities, enterprise administrative control, and operational practices.

A list of example risk factors is provided in FIG. 12. As indicated in the table, any risk can be identified based on its axis, category, attribute, description, attribute value, and/or index value (such as a score or weighting).

Identification and Profiling Engine

The threat detection logic can include a module for user and device identification and profiling (1013). The profiling module can use intercepted credentials to identify the current user. The module can perform organization and user profiling based on passive traffic recordings to identify some or all of the following characteristics:

Organization hierarchy and behavior, including single user usage patterns;

Company roles, detecting administrators, managers and/or different departments;

Company locations, detecting different branches and/or office locations and/or home locations of employees;

Distribution of user activities over the hours of the day, days of the week, months of the year, and special occasions, for the company level and/or the single user level; and Daily user routines, including daily locations, activity times, applications and usage patterns.

The device identification and profiling module can also be configured to distinguish and identify user devices across sessions and browsers based on information derived from:

Tracking sessions with a designated session cookie that holds the device identity, the user identity, and the session information for any SaaS application the user is logged-in to;

JavaScript injection to pages in order to identify devices accessing through the proxy;

Cross-browser storage to link sessions managed from different browsers on the same device; and Unified identities database to keep track of sessions, devices and the links between them.

Feedback

The threat characterization logic can include methods for constructing a supervised learning model for security alerts. The system can collect feedback on alerts, engage both the IT and the employee and dynamically build the user profile by querying the user for suspicious patterns, and/or engage the supervisor, if the user appears suspicious (e.g., a rogue user).

Virtual Network

In a preferred embodiment, the system described above can be in communication with a separate virtual network (1020) in which a mock organization performs activities on various SaaS applications and is monitored by the security gateway. In that embodiment, the virtual network can be an isolated network maintained for research and testing purposes. In other embodiments, the virtual network can be incorporated into the operational network monitoring and threat detection system. The mock organization's characteristics and usage patterns can be calibrated with information from real organizations, which are then recorded by the security gateway. Anomalies can be randomly inserted in the mock traffic to test the detection module. The anomalies can represent either suspicious behavior patterns or attacks. The anomalies can be collected from various sources, including actual anomalies recorded by the security gateway and anomalies that exist in the wild and are discovered by independent research.

The virtual network can be used to perform research on future security features, as well as to test the different components of the system under stress and measure the false-positive and false-negative rates.

The virtual network can include a virtual client (1021) as well as separate instantiations of the security gateway (1022), detection module (1023) and alerts engine (1024). Changes that are to be made in the alerts engine (1014) can be tested first on the virtual alerts engine (1024).

Risk/Threat Weighting

As indicated in the example provided in FIG. 12, the identified risks can be associated with an index value in a cloud service index (1015). This index value can be used to weight the risk factors relative to each other. In some embodiments, multiple risk factors can be assessed together. As a non-limiting example, the index values for threats identified over a period of time in the network traffic can be summed together to provide a numerical value threat indicator.

Responsive Action

The risk weighting can be provided to the detection module (1012) and or the alerts engine (1014). The detection module can then take action on the network traffic based, in whole or in part, on the weighted threat information, and the alerts engine can then make an alert to the client (1001) or to the SaaS provider (1030). In some embodiments, the detection module can provide an instruction to the security gateway (1011) to drop packets being sent to the client (1001) from the SaaS provider (1030) based on the output of the detection module (1012).

Discovery Module Architecture

In some embodiments, a discovery module can be configured to inspect network traffic between a network-based software as a service (SaaS) provider and a client. In these embodiments, the system is capable of being configured to operate on such traffic between the SaaS provider and a client computing device when that computing device is connected to the SaaS provider through a public network (such as the internet) without any controls or restrictions having been placed on the client device or network. In some of these embodiments, no configuration of the client device is necessary. The discovery module can include a SaaS application database, the contents of which are described in more detail below.

In some of those embodiments, the discovery module can be embodied in the managed communications network proxy. While reference may be made herein to a proxy, it is understood that the proxy can be embodied in one or more network devices. Furthermore, the managed network proxy may be decentralized and the functions of the managed network proxy distributed over multiple machines in diverse geographic regions.

In other embodiments, the discovery module is not configured to directly inspect the network traffic passing between a network-based software as a service (SaaS) provider and a client. In those embodiments, the discovery module can initiate SaaS discovery activities from any device on the network. The discovery module can include an applet server and a SaaS application database, the contents of which are described in more detail below.

Discovery of the SaaS Environment

The discovery module, whether residing on an independent device or in the network proxy, can be configured to identify access and usage patterns for any SaaS environment. As used herein, the SaaS environment can include the SaaS platform, any application executing or installed on the platform, data stored on the platform, and/or configuration parameters alone or in combination with other factors.

Figure 13:
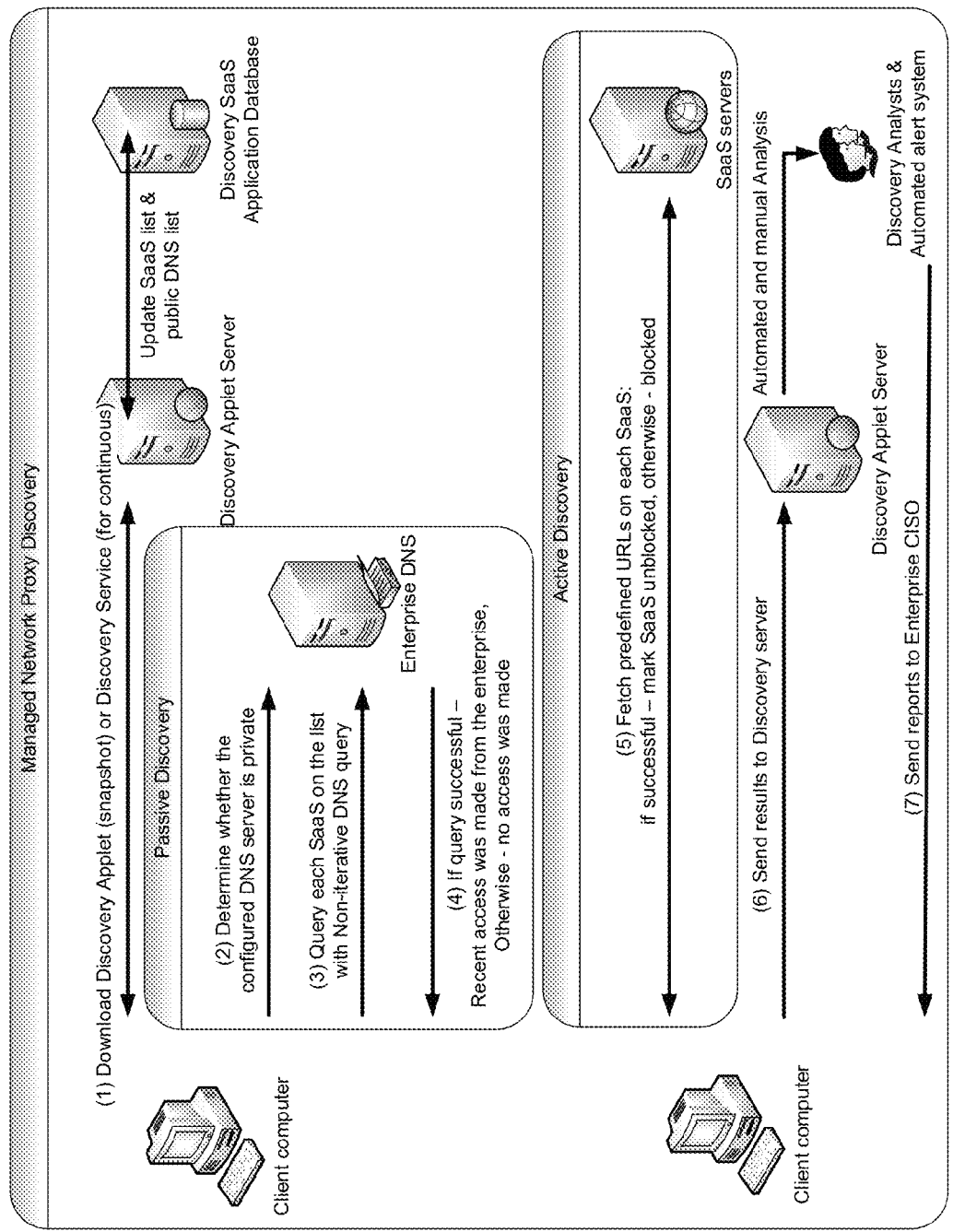
FIG. 13 illustrates an example method of discovery of the software as a service (SaaS) environment.

An example system and method of discovery of the SaaS environment is illustrated in FIG. 13. As illustrated, the client computer may be an administrator or similar type of user with sufficient privileges for performing the discovery functions. The discovery module can be embodied as executable instructions on a client device, such as an application, applet, plug-in or other form of code. In some embodiments, the client can download and execute an application (such as a Java applet) configured to run on any organizational computer and produce a snapshot report. Additionally, the system can be configured for continuous discovery using a service that runs in the background of an organizational or client computer and allows for continuous monitoring of the SaaS.

The system can include a SaaS applications database for storing data representative of a broad range and arbitrary number of SaaS applications and their characteristics. As non-limiting examples, the applications database can include, among other records, records for any SaaS application known to be used on any platform. The records can be updated on a regular basis (e.g., daily) from multiple data sources.

The SaaS application records can include various metrics defining the security level of a particular SaaS and/or SaaS application. As non-limiting examples, metrics recorded can include: whether data is encrypted at rest, SSL encryption level, the presence or absence of built-in security features, database and data center locations, etc.

The system can be configured to automatically perform a risk assessment discovery for a given SaaS platform or application based on any of the metrics described above. The cloud service risk discovery process can execute procedures for performing passive discovery and/or active discovery of the SaaS environment.

Passive Discovery

In some embodiments, passive discovery processes can be used to determine which SaaS applications and/or data stores have been accessed by a user or caused to have been accessed by a user.

The system can be configured to determine whether a local configured Domain Name System (DNS) server is public or organizational (based on an open list of public DNS servers). If organizational, the system can query the enterprise DNS server (non-iteratively) for specific SaaS domains. Based on the response, the system can determine whether a specific application, file, or data set was accessed recently from within that enterprise network. If the query is successful, the system can determine that recent access was made from the enterprise. Otherwise, if the query is unsuccessful, the system can determine that no recent access was made from the enterprise.

Active Discovery

The system can be configured to use targeted queries to test whether a certain SaaS is available within a certain organizational network and thereby determine whether a specific SaaS is blocked within the organization network. For example, the discovery module can attempt to fetch a predefined URL on the SaaS. If the fetch attempt is successful, then the SaaS can be marked as unblocked. If the fetch attempt is unsuccessful, then the SaaS can be marked as blocked.

In some embodiments, active discovery can be used to check for configuration issues. For example, an administrator may not have configured SaaS storage, yet storage is being consumed.

Alerts

The results of the passive and/or active discovery process can be sent to a discovery server or other location for electronic storage. The results can be subject to automated and/or manual analysis.

Based on the results of the discovery process, automated alerts and cloud usage reports can be generated. For example, weekly and/or monthly cloud usage reports can be automatically generated based on the usage data stored in the database. New and trending cloud services used can be shown alone or together with detailed risk analyses. In some embodiments, high-risk SaaS application usage can trigger automatic alerts by email or other means.

SaaS Traffic Captivation

Suffix proxy implementations face the problem of dynamically generated content at the client side. Modern web applications, such as the Google Apps platform, utilize a large amount of client side code (JavaScript). This can make a suffix proxy implementation much more challenging, as basic proxy functions are insufficient and further intervention in the client side code is required.

As described herein, the suffix proxy can be used to keep URLs and web accesses of a proxied web page within the hold of the proxy. This is done by adding a suffix to URLs on the page. In the context of static pages (e.g., those that do not contain client-executable JavaScript code), this can be done on the server side, by the proxy. The method involves parsing HTML and using regular expressions to replace the URLs on the page.

The managed network proxy can be configured to inspect the traffic and detect SaaS Internet addresses. In some embodiments, the managed network proxy can be configured to inspect the network traffic for Internet addresses (such as uniform resource locators, uniform resource identifiers, etc.) As non-limiting examples, the network proxy can decompile, deconstruct, or disassemble network traffic for inspection. The managed network proxy can be configured to modify network traffic between the client device and the SaaS provider so that no network addresses are provided to the user device that would direct the client device to access a SaaS resource directly, bypassing the managed network proxy. If a SaaS Internet address is detected, that address can be rewritten to an address at the network proxy by appending the domain name for the network proxy service to the original network address.

The suffix proxy can be configured for captive page processing by processing SaaS server responses so that subsequent requests are handled by the suffix proxy. The processing may be dependent on the file type and response type. As non-limiting examples, file types processed can include HTML or JavaScript and responses can include gzipped responses or chunked responses. The suffix proxy can be configured to emulate any content, including webpages, sent from the SaaS provider. The suffix proxy can be configured to inspect and/or decompile any content to identify any referred pages and/or URLs present in the content and rewrite those URLs.

In some cases, the inspection will require executing code or scripts being transferred between the client and the SaaS provider. For example, JavaScript can be emulated at the network proxy to detect the generation of network addresses that would directly access the SaaS provider. If direct access addresses are identified in the content, the content can be modified to rewrite the address to refer to the network proxy.

Proxy Using In-Time JavaScript Translation

With client side JavaScript, run-time changes to the Document Object Model (DOM) of a page are possible, and as a result, it is possible for the client browser to create or modify DOM elements with un-suffixed URLs (because the server side proxy has no chance of replacing them). Systems and methods for restricting the access of a web application's JavaScript code to the DOM are described below.

The nature of the restriction can be such that changes to web URLs in the DOM from the original JavaScript code will be monitored by a run-time component of the proxy. With caching, any impact on run-time performance of the JavaScript code can be reduced.

Monitoring code can be invoked for read and write accesses to DOM elements such that writes of a URL into the DOM are suffixed and reads of a URL from the DOM are un-suffixed. As a result, there can be separation between the URLs seen by "user" JavaScript code (e.g., the web-applications code) and the browser itself (the DOM, and the JavaScript representation of it). As a result, the original JavaScript code can be effectively maintained inside the proxy environment such that communication with the original server (around the proxy) are prevented.

Server-Side Proxy Implementation

JavaScript code that is loaded as part of a web application can be acquired from the original server in any of several forms, including inline scripts inside HTML pages and JavaScript files (usually with a Content-Type of "text/javascript"). The systems described herein can also be configured to operate on other types of code, script, or content, such as CSS.

Typically, the browser will first load the main HTML page, and then subsequently load all referenced and inline scripts. Additional JavaScript (or HTML containing scripts) can also be loaded dynamically by the web application, using, for example, the "eval" statement.

Because dynamic code loading is initially performed by the statically loaded code (or, once loaded, other dynamic code), the system can take control of execution by modifying the static JavaScript code during the page download stage on the proxy server. The modifications to the code can be performed such that future dynamically loaded code will be modified during run-time and specific changes to the DOM can be intercepted in order to enforce the aforementioned rules, which will allow the page to remain in the control of the proxy.

Figure 14:
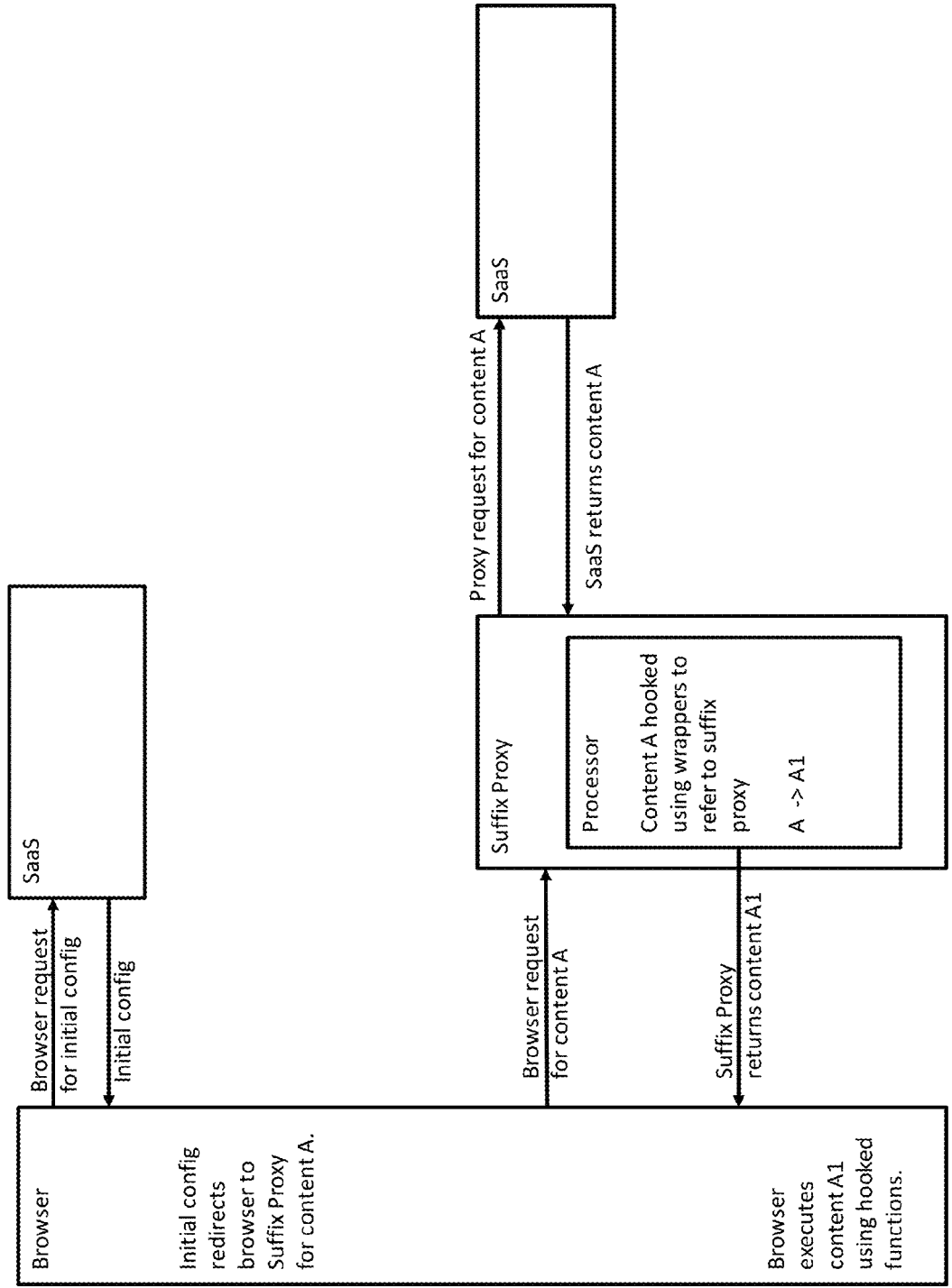
FIG. 14 illustrates an example method of non-cached suffix proxy operation.
Figure 15:
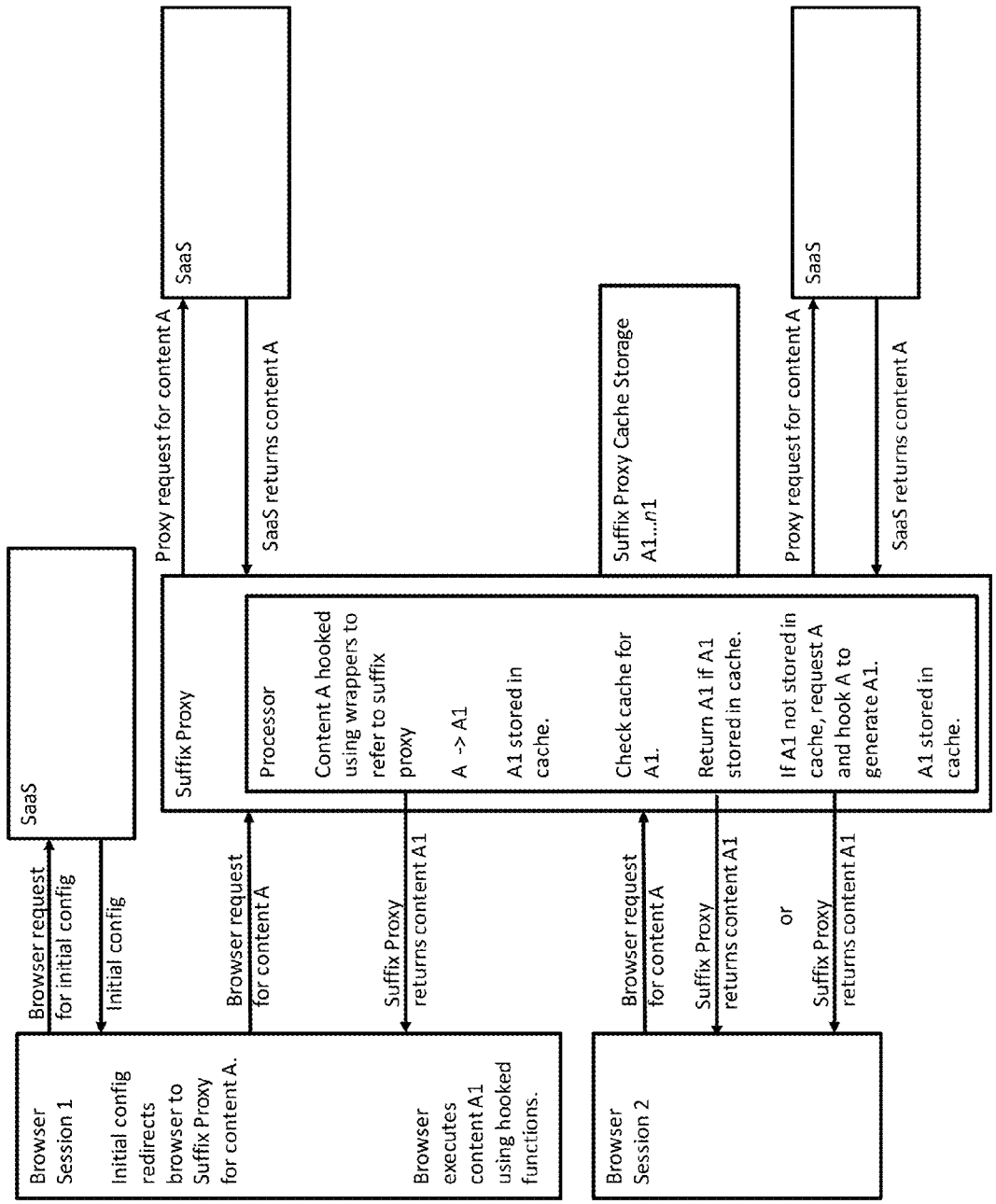
FIG. 15 illustrates an example method of cached suffix proxy operation.

Modification of dynamically loaded code can be achieved by sending dynamically evaluated code to the proxy or receiving dynamically evaluated code at the proxy for processing, and then allowing the new code to be loaded at the client browser. An example method of non-cached operation is illustrated in FIG. 14. In some embodiments, caching can be employed to improve performance, as described in more detail below and illustrated in FIG. 15.

As non-limiting examples, at least the following DOM elements and properties can be wrapped:

1. Properties of HTML elements that contain URLs:
   a. The elements: "IFRAME", "STYLE", "LINK", "IMG", "AUDIO", "A", "FORM", "BASE" and "SCRIPT".
   b. For each one, where they apply, the properties: "src", "href" and "action".
   c. The getAttribute and setAttribute methods of these elements can also be used to set the aforementioned properties.
2. Properties of HTML elements that can contain a DOM sub-tree (i.e., more HTML):
   a. The "appendChild" method can be used add elements (and code) dynamically.
   b. The "innerHTML" property can be used to add extra code.
3. Properties of the "document" object that contain URLs or Hostnames:
   a. "cookie", "domain"—both can contain the origin domain of the window.
   b. The "write" method can be used to add elements and code to the page.
4. The "open" method of XMLHttpRequest objects contains a request URL.
5. The "origin" property of "MessageEvent" objects contains the origin hostname.
6. Methods and properties of the "Window" object:
   a. "location"—can redirect the frame to another URL, or determine the current location of the frame.
   b. The "postMessage" method—has an origin argument.
   c. "eval" and "execScript"—are used to load code dynamically.

Other such elements and properties exist, and any or all of them could be wrapped.

Static Hooking of JavaScript Code

Static hooking can be used for multiple types of content, including inline scripts and files. At the proxy server, proxied JavaScript code can be processed as follows:

1. Inline scripts in HTML are extracted and processed.
2. The code is converted into an Abstract Syntax Tree (AST) according to the Mozilla Parser API specification using open source parsing libraries.
3. The AST is traversed recursively, and calls to wrappers are inserted around certain nodes of the AST to allow for hooking.
4. Code can be re-built from the patched AST and sent to the client browser.
5. Caching of resulting processed code can be performed.

The inserted wrappers can allow for DOM changes to be caught during run-time. The wrappers can be applied to cover any or all potential DOM accesses.

As non-limiting examples, the wrappers can be applied to some or all the following AST nodes:

1. MemberExpression:
   a. Potential accesses to object properties of DOM objects are wrapped.
   b. Subscription operations with non-literal keys are wrapped.
   c. Access to specific properties (for example, obj.src) is wrapped if the property name matches a white-list of "interesting" properties.
   d. Eventually, the run-time wrapper decides whether any changes are necessary. In most cases—for example, "false positives"—the wrapper will decide to do nothing.
2. Identifier:
   a. Potential accesses to a white-list of global Identifiers (which are properties of the window DOM object, e.g., "location") are wrapped.
   b. Identifier AST nodes can appear in many unrelated logical positions in the tree. Instances where the Identifier represents access to a global variable are wrapped. This is determined during the traversal stage by checking the parent nodes and eliminating all other cases.
3. AssignmentExpression:
   a. Assignments to previously "marked" MemberExpressions and Identifiers are handled by another wrapper that specifically handles "set" access.
   b. The "=" and "+=" assignment operators are wrapped, as relevant DOM properties may be strings (URLs).
4. CallExpression:
   a. CallExpressions where a previously "marked" MemberExpression or Identifier is the callee are handled by another wrapper that specifically handles function calls.
   b. A special case exists with the call to "eval", which behaves like a statement, but is represented as a function call in the AST.

Example code before and after wrapping:

Before

```
var new_src = location + '/image';
some_img.src = new_src;
var w = window.open('test');
eval('test( )');
var loc = x.src;
postMessage('some_message', 'origin');
```

-continued

After

```
var new_src = ___WRAPPED_name_get('location', location) +
'/image';
___WRAPPED_set(some_img, 'src', '=', new_src);
var w = ___WRAPPED_call(window, 'open')('test');
eval(___WRAPPED_eval_param(eval, 'test( )'));
var loc = ___WRAPPED_get(x, 'src');
___WRAPPED_name_call('postMessage',
postMessage)('some_message', 'origin');
```

Run-Time Behavior of the Wrappers

A number of different wrapper functions can be defined (according to the different wrapping cases during the AST traversal phase):

1. wrapped_get, wrapped_set, wrapped_call—wrap access to MemberExpressions according to the different use cases.
2. wrapped_name_get, wrapped_name_set, wrapped_name_call—wrap access to global Identifiers according to the different use cases.
3. wrapped_eval_param—specifically handles the code passed as the parameter of an "eval" call (which can affect the local scope).

In some embodiments, the system can first detect if the wrapper was invoked on relevant objects or properties:

1. In "MemberExpression" wrappers, the property name is checked against a white-list, as well as the subscripted object.
2. With "Identifier" wrappers, a white-list is consulted as well.
3. Objects are determined to be of a certain type ("Document", "Window", HTML elements, and so on), and are also compared to global instances when applicable.

These comparisons and lookups can be performed efficiently without significant impact on performance in many cases.

A wrapper call can be processed using any one of various procedures, including, as non-limiting examples:

1. Process dynamically loaded code:
   a. New JavaScript code is sent to a special REST API endpoint of the proxy for translation and caching, as described below.
   b. This can occur in wrappers of "appendChild", "innerHTML", "eval", "execScript" and "write".
2. Suffix or un-suffix a URL or hostname.
3. Detect a false positive wrapper invocation and resume normal execution.

Wrapper handlers that are responsible for handling DOM access to URL-related properties or methods can be divided into logical groups, for example:

1. getters—handle "get" wrappers. These will un-suffix handled URLs.
   a. If a method (JavaScript type "function") is accessed, a "decorator" is returned (see below).
2. setters—these handle "set" wrappers. They will suffix assigned URLs.
3. decorators—these handle "call" wrappers. They will return matching decorator functions for the wrapped methods, which will suffix or un-suffix URLs according to what the decorated method is.
   a. This decorator can be bound to the correct object using the JavaScript "bind" method. In case of "Identifier" wrappers, the correct object is the global object (in some cases, a window). In case of "MemberExpression" wrappers, this is the object being subscripted.

Performance Impact and Optimizations

In some cases, there may be a performance impact from running the processes described herein, some of which may be experienced by the user of the proxied web-application due to JavaScript translation and AST traversal over large scripts and run-time wrappers preventing the JavaScript JIT compilers from optimizing the code in the browsers.

To improve the overhead of the translation phase, a cache can be implemented:

1. On the server side, elements of translated JavaScript code (e.g., inline script, file, or dynamic translation request) are cached locally per server.

2. The entries are keyed by a cryptographic hash of the original code.

3. The cache is thus shared across users of the proxy. This way, only the first user per-server will experience the impact of the translation phase for commonly loaded scripts.

4. The dynamic script translation REST endpoint can also be configured to accept a client-side calculated hash and perform a lookup in the cache using it. This can reduce usage of upload bandwidth for the users of the proxy. In this configuration, dynamically generated scripts may almost never be actually sent to the proxy (except for the first time).

5. In addition, the responses for dynamic translation requests (per hash) are returned with "Cache-Control" and "Expires" HTTP headers such that the result will be cached by the client's browser. In this manner, a client will be less likely to need to query the proxy server for the same dynamically generated scripts more than once.

Given the above optimizations, the impact of the translation phase can be greatly reduced from normal use cases.

The run-time performance impact of the wrappers can be mitigated by some or all of:

1. Creating an optimized fast-path for irrelevant/false-positive wrapper invocations (at the code level). This is achieved by writing the basic wrapper functions with a limited subset of JavaScript that will be easily optimized by the browser's JIT compiler.

2. A manual maintenance interface that allows for profiling and detection of the code paths having the most cache hits, and enables (manually) removing certain wrappers from the translated code in the proxy's internal cache.

System Implementation

The systems and methods described herein can be implemented in software, hardware, or any combination thereof. The systems and methods described herein can be implemented using one or more computing devices, which may or may not be physically or logically separate from each other. Additionally, various aspects of the methods described herein may be combined or merged into other functions.

In some embodiments, the system elements could be combined into a single hardware device or separated into multiple hardware devices. If multiple hardware devices are used, the hardware devices could be physically located in proximity to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, a keyboard, and an input device, such as a mouse or trackball by which the user can provide input to the computer.

A computer program can be a set of instructions that can be used, directly or indirectly, in a computer. The systems and methods described herein can be implemented using programming and/or markup languages such as Perl, Python, JAVA™, C++, C, C#, Visual Basic™, JavaScript™, PHP, Flash™, XML, HTML, etc., or a combination of programming and/or markup languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols and standards such as SOAP/HTTP, JSON, SQL, etc. may be used in implementing interfaces between programming modules. The components and functionality described herein may be implemented on any desktop or server operating system executing in a virtualized or non-virtualized environment, using any programming language suitable for software development, including, but not limited to, different versions of Microsoft™ Windows™, Apple™ Mac™, iOS™, Unix™/X-Windows™, Linux™, etc.

In some embodiments, one or more servers can function as a file server and/or can include one or more of the files used to implement methods of the invention incorporated by an application running on a user computer and/or another server. Alternatively, a file server can include some or all necessary files, allowing such an application to be invoked remotely by a user computer and/or server. The functions described with respect to various servers herein (e.g., application server, database server, web server, file server, etc.) can be performed by a single server and/or a plurality of specialized servers, depending on implementation-specific needs and parameters.

In some embodiments, the system can include one or more databases. The location of the database(s) is discretionary. As non-limiting examples, a database might reside on a storage medium local to (and/or resident in) a server (and/or a user computer). Alternatively, a database can be remote from any or all of the computing devices, so long as it can be in communication (e.g., via a network) with one or more of these. In some embodiments, a database can reside in a storage area network (SAN). The SAN can be implemented as a computerized data storage device group. Some or all of the necessary files for performing the functions attributed to the computers can be stored locally on the respective computer and/or remotely, as appropriate. In some embodiments, the database can be a relational database, such as an Oracle database, that is adapted to store, update, and retrieve data in response to SQL-formatted commands. The database can be controlled and/or maintained by a database server.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example: semiconductor memory devices, such as EPROM, EEPROM, and flash memory devices; magnetic disks, such as internal hard disks and removable disks; magneto-optical disks; and/or CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, but are not limited to, a LAN, a WAN, or any of the networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations, and equivalents thereof are included within the scope of the invention.

What is claimed is:

1. A method for processing instructions to modify a future request for content, comprising:
receiving, at a proxy server configured as a suffix proxy, a request for content including executable instructions, wherein the requested content includes a script;
retrieving the requested content from a server hosting a cloud-based application and storing the requested content at the proxy server;
parsing the requested content to identify at least one executable instruction of the executable instructions configured for generating a uniform resource locator (URL) address of the cloud-based application;
modifying the requested content by wrapping the at least one identified instruction to call an alternative instruction, wherein the alternative instruction is configured to suffix identification of a suffix proxy to the URL to create a suffixed URL;
storing, at the proxy server, the modified content including the at least one wrapped instruction;
transmitting the modified content including the at least one wrapped instruction to a client device; and
monitoring, at the proxy server, run-time changes to a Document Object Model (DOM) performed by the client device to control and read and write run-time access to the DOM when at least reading and writing to the suffixed URL.

2. The method of claim 1, wherein the script is any of: JavaScript and a Cascading Style Sheets (CSS) file.

3. The method of claim 1, further comprising:
determining if the requested content as modified including the wrapped instruction is stored on the proxy server; and
sending the modified content to the client device without retrieving the requested content from the server, when the requested content as modified including the at least one wrapped instruction is stored on the proxy server.

4. A system operating as a suffix proxy for processing instructions to modify a future request for content, comprising:
a processor; and
a memory, the memory containing said instructions that, when executed by the processor, configured the system to:
receive a request for content including executable instructions, wherein the requested content includes a script;
retrieve the requested content from a server hosting a cloud-based application; store the requested content;
parse the requested content to identify at least one executable instruction of the executable instructions configured for generating a uniform resource locator (URL) address of the cloud-based application;
modify the requested content by wrapping the at least one identified instructions to call an alternative instruction, wherein the alternative instruction is configured to suffix identification of a suffix proxy to the URL to create a suffixed URL;
store the modified content including the at least one wrapped instruction;
transmit the modified content including the at least one wrapped instruction to a client device; and
monitor run-time changes to a Document Object Model (DOM) performed by the client device to control any read and write run-time access to the DOM when at least reading and writing to the suffixed URL.

5. The system of claim 4, wherein the script is any of: JavaScript, and a Cascading Style Sheets (CSS) file.

6. The system of claim 4, wherein the system is further configured to:
determine if the requested content as modified including the wrapped instruction is stored on the proxy server; and send the modified content to the client device without retrieving the requested content from the server, when the requested content as modified including the at least one wrapped instruction is stored on the proxy server.

* * * * *